(12) United States Patent
Park et al.

(10) Patent No.: US 10,827,429 B2
(45) Date of Patent: Nov. 3, 2020

(54) METHOD AND APPARATUS FOR TRANSMITTING WAKEUP PACKET IN WIRELESS LAN SYSTEM

(71) Applicant: LG ELECTRONICS INC., Seoul (KR)

(72) Inventors: Eunsung Park, Seoul (KR); Dongguk Lim, Seoul (KR); Hangyu Cho, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/328,676

(22) PCT Filed: Aug. 14, 2017

(86) PCT No.: PCT/KR2017/008827
§ 371 (c)(1),
(2) Date: Feb. 26, 2019

(87) PCT Pub. No.: WO2018/043952
PCT Pub. Date: Mar. 8, 2018

(65) Prior Publication Data
US 2019/0191377 A1    Jun. 20, 2019

Related U.S. Application Data

(60) Provisional application No. 62/380,460, filed on Aug. 28, 2016, provisional application No. 62/382,720, (Continued)

(51) Int. Cl.
*H04W 52/02* (2009.01)
*H04L 27/02* (2006.01)
(Continued)

(52) U.S. Cl.
CPC ......... *H04W 52/0229* (2013.01); *H04L 27/02* (2013.01); *H04L 27/066* (2013.01);
(Continued)

(58) Field of Classification Search
CPC . H04W 52/0229; H04W 84/12; H04W 72/04; H04W 52/02; H04L 27/06; H04L 5/0007; H04L 5/0091; H04L 5/0053
(Continued)

(56) References Cited

U.S. PATENT DOCUMENTS

2014/0120962 A1*  5/2014  Merlin .................. H04W 68/02
                                                                    455/466
2015/0036576 A1   2/2015  Jafarian et al.
(Continued)

OTHER PUBLICATIONS

PCT International Application No. PCT/KR2017/008827, International Search Report dated Nov. 27, 2017, 4 pages.
(Continued)

*Primary Examiner* — Kwang B Yao
*Assistant Examiner* — Syed M Bokhari
(74) *Attorney, Agent, or Firm* — Lee, Hong, Degerman, Kang & Waimey

(57) ABSTRACT

A method and an apparatus for transmitting a wakeup packet in a wireless LAN system are proposed. Particularly, a transmission device configures a wakeup packet and transmits the wakeup packet to a receiving device. The wakeup packet includes a sequence configured with first information and second information by applying an OOK method. The first information and the second information are configured with an on-signal or an off-signal. The on-signal is transmitted through a first symbol, which is generated by applying a first sequence to K consecutive subcarriers in the 20 MHz band and performing 64-point IFFT. The off-signal is transmitted through a second symbol, which is generated by applying a second sequence to K consecutive subcarriers in
(Continued)

the 20 MHz band and performing 64-point IFNT. The first information and the second information are transmitted through a third symbol in which the first symbol or the second symbol is repeated.

18 Claims, 13 Drawing Sheets

Related U.S. Application Data filed on Sep. 1, 2016, provisional application No. 62/430,924, filed on Dec. 7, 2016, provisional application No. 62/459,054, filed on Feb. 14, 2017, provisional application No. 62/484,345, filed on Apr. 11, 2017, provisional application No. 62/488,858, filed on Apr. 24, 2017.

(51) Int. Cl.
  *H04W 84/12* (2009.01)
  *H04L 27/06* (2006.01)
  *H04W 72/04* (2009.01)
(52) U.S. Cl.
  CPC ... *H04W 52/0235* (2013.01); *H04W 52/0274* (2013.01); *H04W 72/0453* (2013.01); *H04W 84/12* (2013.01); *Y02D 70/00* (2018.01); *Y02D 70/10* (2018.01); *Y02D 70/14* (2018.01)
(58) Field of Classification Search
  USPC .......................................................... 370/311
  See application file for complete search history.

(56) References Cited

U.S. PATENT DOCUMENTS

2016/0183187 A1    6/2016  Park
2018/0019902 A1*   1/2018  Suh .................... H04L 27/2602
2018/0288706 A1*  10/2018  Fang ................. H04W 52/0235

OTHER PUBLICATIONS

Park, M. et al., "LP-WUR (Low-Power Wake-Up Receiver) Follow-Up", doc.: IEEE 802.11-16/0341r0, Mar. 2016, 10 pages.
Seok, Y. et al., "Coexistence Mechanism for Wakeup Radio Signal", doc.: IEEE 802.11-16/1114r0, Aug. 2016, 12 pages.
Hsu, F. et al., "LP WUR Wake-up Packet Identity Considerations", doc.: IEEE 802.11-16/0402r0, 11 pages.

* cited by examiner

FIG. 1
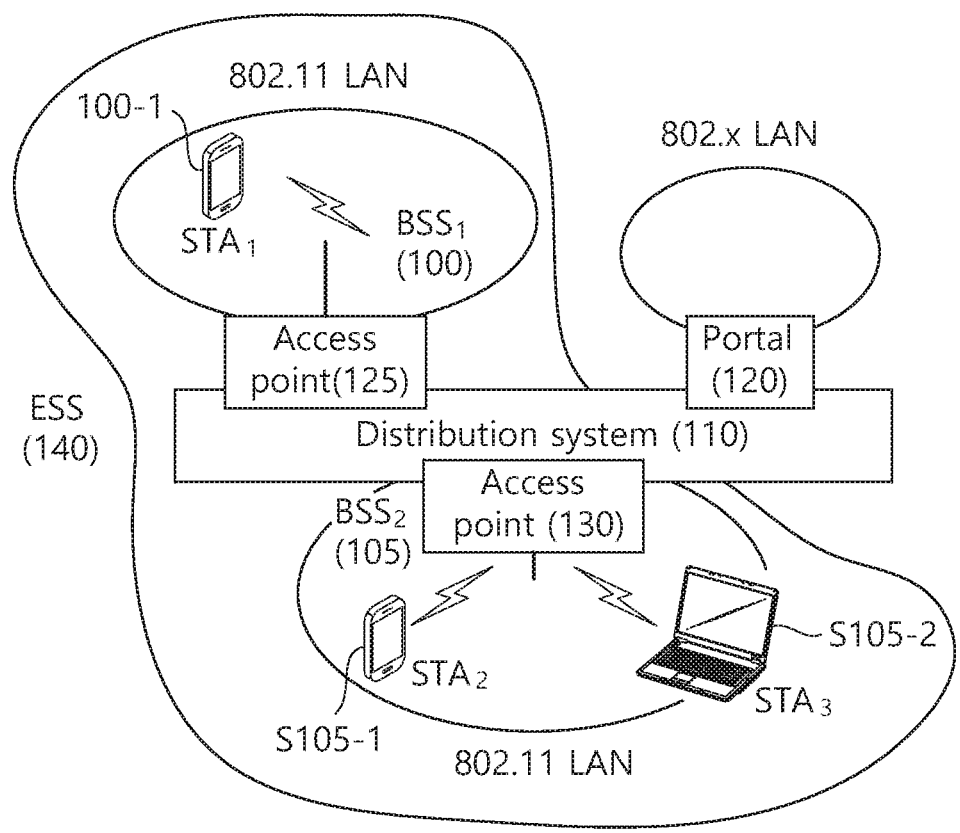
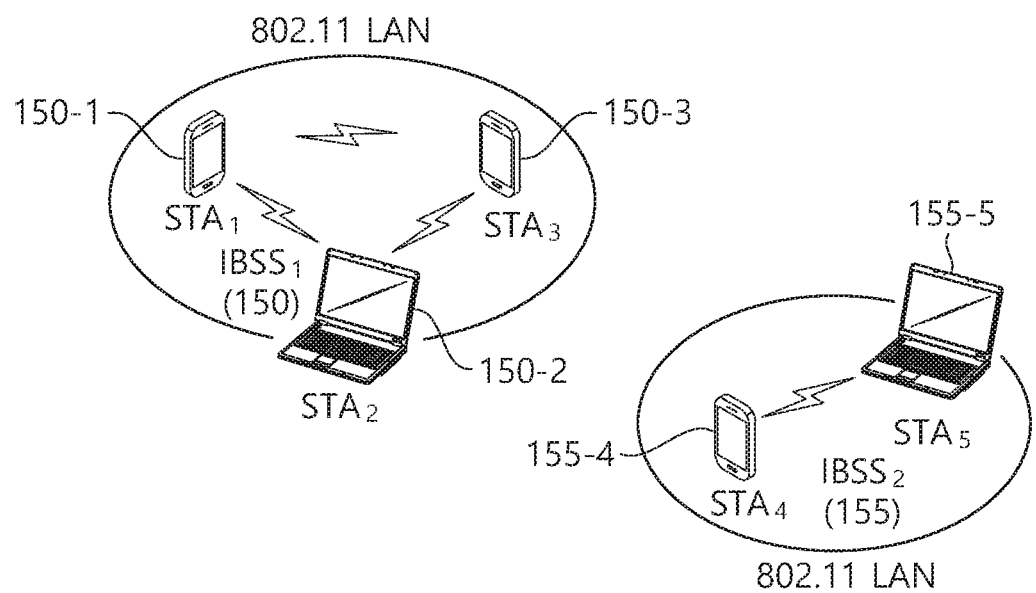

FIG. 11

☐ 4us (CP+3.2us) or 3.2us-length symbol

<Option 1>

| | n number | |
|---|---|---|
| Information 0 | 0 0 ... | 0 |
| Information 1 | 1 1 ... | 1 |

<Option 2>

| | n number | | |
|---|---|---|---|
| Information 0 | 0 1 ... 0 | 1 | or |
| Information 1 | 1 0 ... 1 | 0 | or |

| 1 0 ... 1 0 |
| 0 1 ... 0 1 |

<Option 3>

| | n number | | |
|---|---|---|---|
| Information 0 | 0 0 ... 1 | 1 | or |
| Information 1 | 1 1 ... 0 | 0 | or |

| 1 1 ... 0 0 |
| 0 0 ... 1 1 |

<Option 4>

| | n number | | |
|---|---|---|---|
| Information 0 | 1 1 0 ... | 1 | Case where number of Symbol 1 is odd number and number of Symbol 0 is even number (or vice versa) |
| Information 1 | 0 0 1 ... | 0 | Case where number of Symbol 0 is odd number and number of Symbol 1 is even number (or vice versa) |

METHOD AND APPARATUS FOR TRANSMITTING WAKEUP PACKET IN WIRELESS LAN SYSTEM

CROSS-REFERENCE TO RELATED APPLICATIONS

This application is the National Stage filing under 35 U.S.C. 371 of International Application No. PCT/KR2017/008827, filed on Aug. 14, 2017, which claims the benefit of U.S. Provisional Application No. 62/380,460, filed on Aug. 28, 2016, 62/382,720, filed on Sep. 1, 2016, 62/430,924, filed on Dec. 7, 2016, 62/459,054, filed on Feb. 14, 2017, 62/484,345, filed on Apr. 11, 2017, and 62/488,858, filed on Apr. 24, 2017, the contents of which are all hereby incorporated by reference herein in their entirety.

BACKGROUND OF THE INVENTION

Field of the Invention

This specification relates to a method for performing low-power communication in a wireless LAN (WLAN) system and, most particularly, to a method and apparatus for transmitting a wake-up packet by applying an OOK scheme and a symbol repetition method coding in a wireless LAN (WLAN) system.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY OF THE INVENTION

Technical Objects

This specification proposes a method and apparatus for transmitting a wake-up packet by applying an OOK scheme and a symbol repetition method in a wireless LAN (WLAN) system.

Technical Solutions

An example of this specification proposes a method and device for transmitting a wake-up packet in a wireless LAN system.

The exemplary embodiment of this specification may be performed by the transmitting device. And, a receiving device may correspond to a low-power wake-up receiver, and the transmitting device may correspond to an AP.

Firstly, the terms will be defined. An ON-signal may correspond to a signal having an actual power value. An OFF-signal may correspond to a signal that does not have an actual power value. A first information may correspond to Information 0, and a second information may correspond to Information 1.

The transmitting device generates a wake-up packet.

The transmitting device transmits the wake-up packet to the receiving device.

The generation process of the wake-up packet will hereinafter be described in detail.

The On-Off Keying (OOK) scheme is applied in the wake-up packet. Accordingly, the wake-up packet includes a sequence being configured of the first information and the second information.

The first information and the second information are configured of an ON-signal or an OFF-signal. The ON-signal may indicate 1, and the OFF-signal may indicate 0.

The ON-signal is transmitted through a first symbol, which is generated by applying a first sequence on K number of consecutive subcarriers of a 20 MHz band and by performing 64-point Inverse Fast Fourier Transform (IFFT). More specifically, the ON-signal may be transmitted through a symbol, which is generated by performing IFFT on one bit. At this point, K is an integer.

Additionally, the OFF-signal may be transmitted through a second symbol, which is generated by applying a second sequence to K number of consecutive subcarriers of a 20 MHz band and by performing 64-point IFFT. In the second sequence, the coefficients of all subcarriers may be set to 0.

The first information and the second information are transmitted through a third symbol, which corresponds to a repetition of the first symbol or the second symbol. By performing the symbol repetition method, the symbol (time domain signal) that is generated by performing IFFT may be repeated at least 2 times or more, thereby extending the length of a symbol.

It will be assumed that the symbol that is generated by performing IFFT is repeated n number of times. Herein, n is an integer being equal to 2 or more. Therefore, the third symbol may be configured of n number of symbols. The first information and the second information may be configured of n number of ON-signals or OFF-signals.

For example, the first information may be configured of only n number of OFF-signals, and the second information may be configured of only n number of ON-signals. Additionally, the first information may be configured of a combination of ON-signals and OFF-signals corresponding to n number of signals. And, the second information may also be configured of a combination of ON-signals and OFF-signals corresponding to n number of signals.

More specifically, in a case where n is equal to 4, various exemplary embodiments of the configuration of the first information and the second information will hereinafter be described in detail. Herein, the ON-signal may be indicated as a 3.2 us ON-signal, and the OFF-signal may be indicated as a 3.2 us OFF-signal.

For example, the first information may be configured of 3.2 us OFF-signal+3.2 us OFF-signal+3.2 us OFF-signal+3.2 us OFF-signal, and the second information may be configured of 3.2 us ON-signal+3.2 us ON-signal+3.2 us ON-signal+3.2 us ON-signal. More specifically, the first information may be configured only of OFF-signals, and the second information may be configured only of ON-signals. In other words, the first information may be configured of 4 OFF-signals, and the second information may be configured of 4 ON-signals.

As another example, the first information may be configured of 3.2 us ON-signal+3.2 us ON-signal+3.2 us ON-signal+3.2 us OFF-signal, and the second information may be configured of 3.2 us ON-signal+3.2 us ON-signal+3.2 us OFF-signal+3.2 us ON-signal. More specifically, each of the first information and the second information may be configured to include one OFF-signal, and the remaining signals may all correspond to ON-signals.

As yet another example, the first information may be configured of 3.2 us ON-signal+3.2 us ON-signal+3.2 us OFF-signal+3.2 us ON-signal, and the second information may be configured of 3.2 us ON-signal+3.2 us ON-signal+3.2 us ON-signal+3.2 us OFF-signal. Although the signal alignment order is different, as described above in the previous example, each of the first information and the second information may be configured to include one OFF-signal, and the remaining signals may all correspond to ON-signals.

As yet another example, the first information may be configured of 3.2 us ON-signal+3.2 us ON-signal+3.2 us OFF-signal+3.2 us ON-signal, and the second information may be configured of 3.2 us ON-signal+3.2 us OFF-signal+3.2 us ON-signal+3.2 us ON-signal. Similarly, although the signal alignment order is different, as described above in the previous examples, each of the first information and the second information may be configured to include one OFF-signal, and the remaining signals may all correspond to ON-signals.

As yet another example, the first information may be configured of 3.2 us ON-signal+3.2 us OFF-signal+3.2 us ON-signal+3.2 us ON-signal, and the second information may be configured of 3.2 us ON-signal+3.2 us ON-signal+3.2 us OFF-signal+3.2 us ON-signal. Similarly, although the signal alignment order is different, as described above in the previous examples, each of the first information and the second information may be configured to include one OFF-signal, and the remaining signals may all correspond to ON-signals.

As yet another example, the first information may be configured of 3.2 us ON-signal+3.2 us ON-signal+3.2 us OFF-signal+3.2 us OFF-signal or 3.2 us OFF-signal+3.2 us OFF-signal+3.2 us ON-signal+3.2 us ON-signal, and the second information may be configured of 3.2 us OFF-signal+3.2 us OFF-signal+3.2 us ON-signal+3.2 us ON-signal or 3.2 us ON-signal+3.2 us ON-signal+3.2 us OFF-signal+3.2 us OFF-signal. Similarly, although the signal alignment order is different, as described above in the previous examples, each of the first information and the second information may be configured to include one OFF-signal, and the remaining signals may all correspond to ON-signals.

According to the exemplary embodiment of this specification, each of the first information and the second information may be configured of one OFF-signal and three ON-signals.

As a further example, the first information may be configured of 3.2 us ON-signal+3.2 us OFF-signal+3.2 us ON-signal+3.2 us OFF-signal, and the second information may be configured of 3.2 us OFF-signal+3.2 us ON-signal+3.2 us OFF-signal+3.2 us ON-signal. More specifically, each of the first information and the second information may be configured of two OFF-signals and two ON-signals.

Additionally, the wake-up packet may include a wake-up preamble and a wake-up payload. The third symbol may be included in the wake-up payload.

According to the symbol repetition method, by generating a wake-up packet (most particularly, a wake-up payload) by repeating symbols, a range that is required in low-latency (or low-delay) communication may be satisfied.

For example, in case n is equal to 2, the data rate of the wake-up payload may be 125 Kbps. In case n is equal to 4, the data rate of the wake-up payload may be 62.5 Kbps. And, in case n is equal to 8, the data rate of the wake-up payload may be 31.25 Kbps. By applying the symbol repetition method, a range that is required in low-latency communication may be more easily achieved as compared to a case where only the OOK scheme is applied.

Additionally, even though the symbol is repeated n number of times, each of the first information and the second information corresponds to a 1-bit information.

Additionally, the ON-signal may correspond to a signal given a power value of alpha*ones(1,K). The OFF-signal may correspond to a signal given a power value of zeros(1,K). The alpha is a power normalization factor and may, for example, be equal to 1/sqrt(K). More specifically, the transmitting device may know, in advance, the power values of the ON-signal and the OFF-signal and may configure the first information and the second information accordingly. By using an envelope detector for decoding the first information and the second information, the receiving device may reduce the amount of power that is consumed when performing the decoding process.

The K number of subcarriers may correspond to a partial band of the 20 MHz band. For example, when it is assumed that K=13, and that 20 MHz corresponds to the reference band, even though 64 subcarriers (or bit sequences) may be used, only 13 subcarriers are sampled and processed with IFFT. Accordingly, the 13 subcarriers may correspond to a band of approximately 4.06 MHz. More specifically, a specific sequence (first sequence or second sequence) is configured only in the 13 subcarriers, which are selected as a sample, and the remaining subcarriers excluding the 13 subcarriers are all set to 0. More specifically, in the frequency domain, it may be understood that the power exists for only 4.06 MHz of the 20 MHz band.

Additionally, the subcarrier spacing between each of the K number of subcarriers may correspond to 312.5 KHz. Each of the first symbol and the second symbol may have a length of 3.2 us. Accordingly, if the cyclic prefix (CP) is excluded, the third symbol may have a length of n*3.2 us.

Moreover, by inserting a cyclic prefix (CP) in front of each symbol, the occurrence of Inter Symbol Interference (ISI) may be reduced or prevented.

For example, the first information and the second information may include a cyclic prefix (CP). The CP may be inserted in front of each of the first symbol and the second symbol, or the CP may be inserted only in front of the third symbol. If the CP is inserted in front of each of the first symbol and the second symbol, the symbol that is generated by performing the symbol repetition method may be configured of n number of (CP+3.2 us). If the CP is inserted only in front of the third symbol, the symbol that is generated by performing the symbol repetition method may be configured of CP+n number of (3.2 us). The former case is effective in case the influence of the ISI exists in the mid-portion of the signal, and the latter case is effective in case the influence of the ISI is larger at the foremost part of the signal.

At this point, the CP may be given a length of 0.4 us or 0.8 us.

Effects of the Invention

According to an example of this specification, by having a transmitting device transmit a wake-up packet after generating the wake-up packet by applying an OOK modulation method, a receiving device may reduce power consumption by using an envelope detector when performing wake-up decoding. Accordingly, the receiving device may decode the wake-up packet with minimum power.

Additionally, since the transmitting device generates the wake-up packet by applying a symbol repetition method, the range requirement in low-power wake-up communication may be satisfied.

BRIEF DESCRIPTION OF THE DRAWINGS

FIG. 1 is a conceptual view illustrating the structure of a wireless local area network (WLAN).
FIG. 11 illustrates various examples of a symbol repetition method repeating n number of symbols according to an exemplary embodiment of this specification.

DESCRIPTION OF EXEMPLARY EMBODIMENTS

Figure 2:
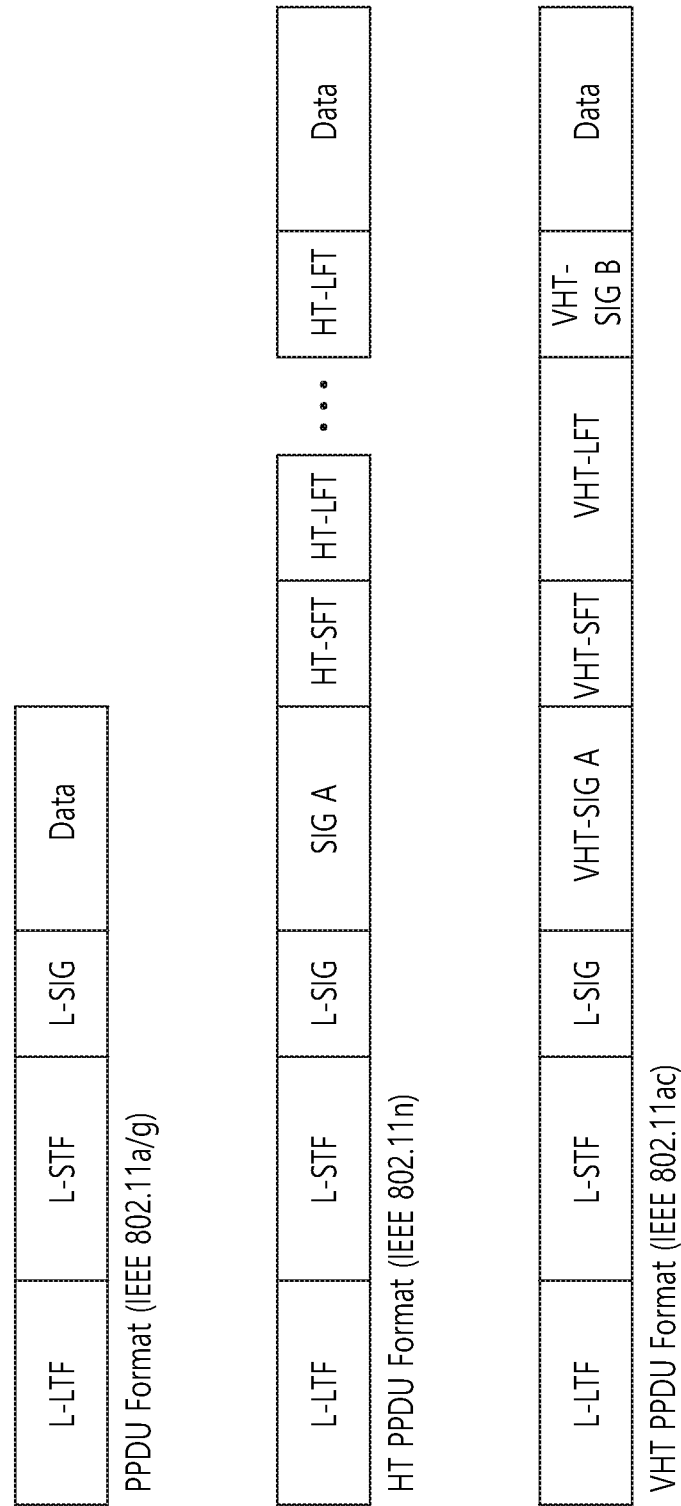
FIG. 2 is a diagram illustrating an example of a PPDU used in an IEEE standard.

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs (100, 105) (hereinafter, referred to as BSS). The BSSs (100, 105) as a set of an AP and an STA such as an access point (AP) (125) and a station (STA1) (100-1) which are successfully synchronized to communicate with each other are not concepts indicating a specific region. The BSS (105) may include one or more STAs (105-1, 105-2) which may be joined to one AP (130).

The BSS may include at least one STA, APs providing a distribution service, and a distribution system (DS) (110) connecting multiple APs.

The distribution system (110) may implement an extended service set (ESS) (140) extended by connecting the multiple BSSs (100, 105). The ESS (140) may be used as a term indicating one network configured by connecting one or more APs (125, 230) through the distribution system (110). The AP included in one ESS (140) may have the same service set identification (SSID).

A portal (120) may serve as a bridge which connects the wireless LAN network (IEEE 802.11) and another network (e.g., 802.X).

In the BSS illustrated in the upper part of FIG. 1, a network between the APs (125, 130) and a network between the APs (125, 130) and the STAs (100-1, 105-1, 105-2) may be implemented. However, the network is configured even between the STAs without the APs (125, 130) to perform communication. A network in which the communication is performed by configuring the network even between the STAs without the APs (125, 130) is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs (150-1, 150-2, 150-3, 155-4, 155-5) are managed by a distributed manner. In the IBSS, all STAs (150-1, 150-2, 150-3, 155-4, 155-5) may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Meanwhile, the term user may be used to indicate diverse meanings. For example, the term user may be used to refer to an STA participating in an uplink MU MIMO and/or uplink OFDMA transmission in a wireless LAN (WLAN) communication. However, the usage of this term will not be limited only to this.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
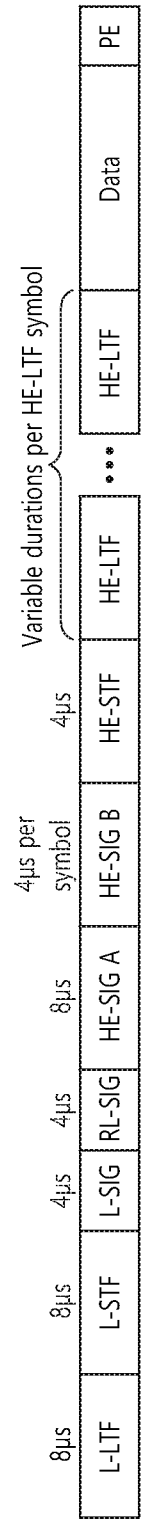
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 μs).

A PPDU that is used in the IEEE standard is described as a PPDU structure being transmitting mainly within a channel bandwidth of 20 MHz. A PPDU structure that is transmitted within a bandwidth (e.g., 40 MHz, 80 MHz) that is wider than the channel bandwidth of 20 MHz may correspond to a structure applying linear scaling of the PPDU structure being used in the channel bandwidth of 20 MHz.

The PPDU that is used in the IEEE standard is generated based on a 64 Fast Fourier Transform (FFT), and a cyclic prefix (CP) portion may correspond to ¼. In this case, the length of a valid (or effective) symbol section (or FFT section) may be equal to 3.2 us, a CP length may be equal to 0.8 us, and a symbol duration may be equal to 4 us (=3.2 us+0.8 us), which corresponds to/is related with a sum of the length of the valid symbol section and the CP length.

A wireless network is ubiquitous, and the wireless network is generally installed indoors but is also often installed outdoors. The wireless network transmits and receives information by using diverse techniques. For example, although the wireless network will not be limited only to this, two of the most broadly supplied techniques that are used for communication correspond to an IEEE 802.11n standard and an IEEE 802.11ac standard, which follow the IEEE 802.11 standard.

The IEEE 802.11 standard designates a common Medium Access Control (MAC) layer, which provides diverse functions for operating the IEEE 802.11 based wireless LAN (WLAN). The MAC layer controls access of shared radio, and, by using a protocol that enhances communication through a radio medium, the MAC layer manages and maintains communication between IEEE 802.11 stations (e.g., a wireless network card (NIC) of a personal computer (PC), another wireless device or stations (STA), and an access point (AP)).

As the next new product of the 802.11ac, IEEE 802.11ax was proposed in order to enhance efficiency of a WLAN network, most particularly, in high-density regions, such as public hotspots and other high-traffic regions. Additionally, the IEEE 802.11 may also use orthogonal frequency division multiple access (OFDMA). A High Efficiency WLAN study group (HEW SG) within an IEEE 802.11 Work Group considers an enhancement in spectrum efficiency in order to enhance the system throughput/surface in a high-density scenario of an access point (AP) and/or station (STA).

Although small computing devices, such as wearable devices, sensors, mobile devices, and so on, are restricted due to their compact battery capacity, small computing devices support wireless communication techniques, such as Wi-Fi, Bluetooth®, Bluetooth® Low Energy (BLE), and so on, and, then, the small computing devices should exchange data by being connected to other computing devices, such as smart phones, tablets, personal computers, and so on. Since such communication consumes power, it is important to minimize power consumption of such communication. One of the most ideal strategies for minimizing power consumption is to maintain data transmission and reception without excessively increasing delay (or latency) and to turn off the power for communication blocks as frequently as possible. More specifically, a communication block is transmitted immediately before data reception, and the communication block is turned on only when data that needs to be woken up exists, and, during the rest of the time, the power of the communication block is turned off.

Hereinafter, a Low-Power Wake-Up Receiver (LP-WUR) will be described in detail.

The communication system (or communication sub-system) that is described in this specification includes a main radio (802.11) and a low-power wake-up receiver.

The main radio is used for the transmission and reception of user data. The main radio is turned off when there is no data or packet that is to be transmitted. The low-power wake-up receiver wakes up the main radio when there is a packet that is to be received. At this point, the user data is transmitted and received by the main radio.

The low-power wake-up receiver is not used (or provide) for the user data. The low-power wake-up receiver corresponds to/is related with a receiver for simply waking up the main radio. More specifically, the low-power wake-up receiver does not include a transmitter. The low-power wake-up receiver is activated while the main radio is turned off. During its activated state, the low-power wake-up receiver aims to achieve its target power consumption of less than 1 mW. Additionally, the low-power wake-up receiver uses a narrow band of less than 5 MHz. Furthermore, a target transmission range of the low-power wake-up receiver is the same as a target transmission range of the legacy 802.11.

Figure 4:
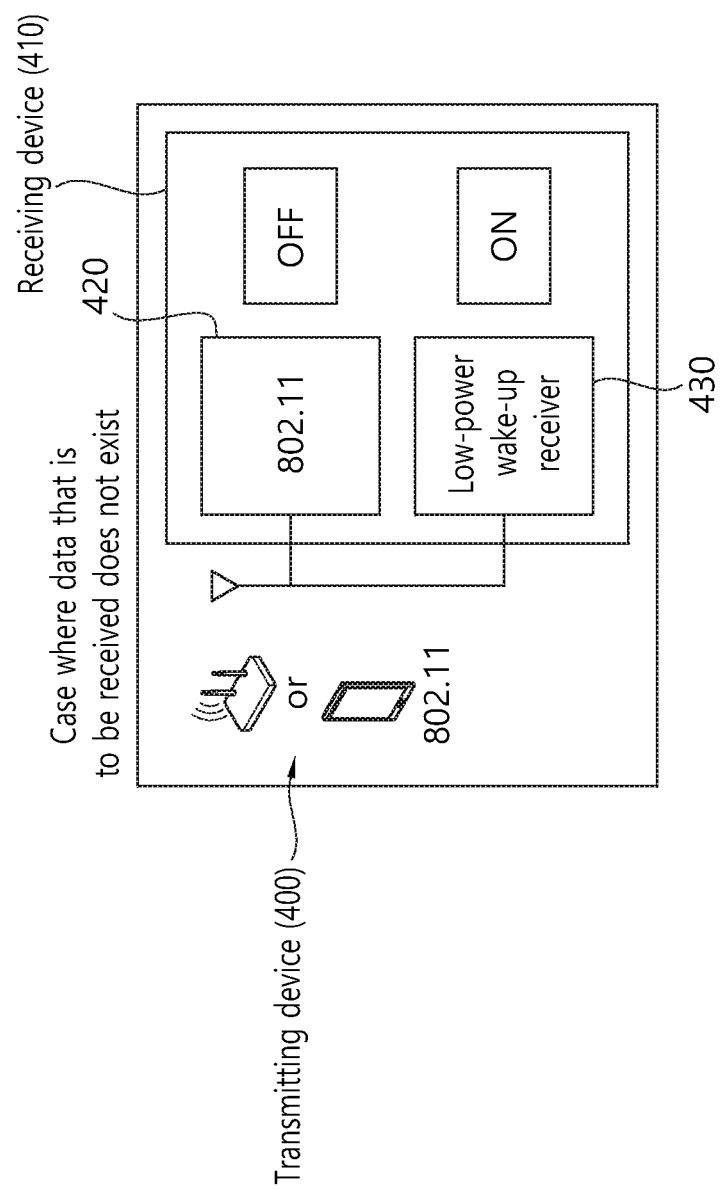
FIG. 4 is a diagram illustrating a low-power wake-up receiver in an environment where data is not received.
Figure 5:
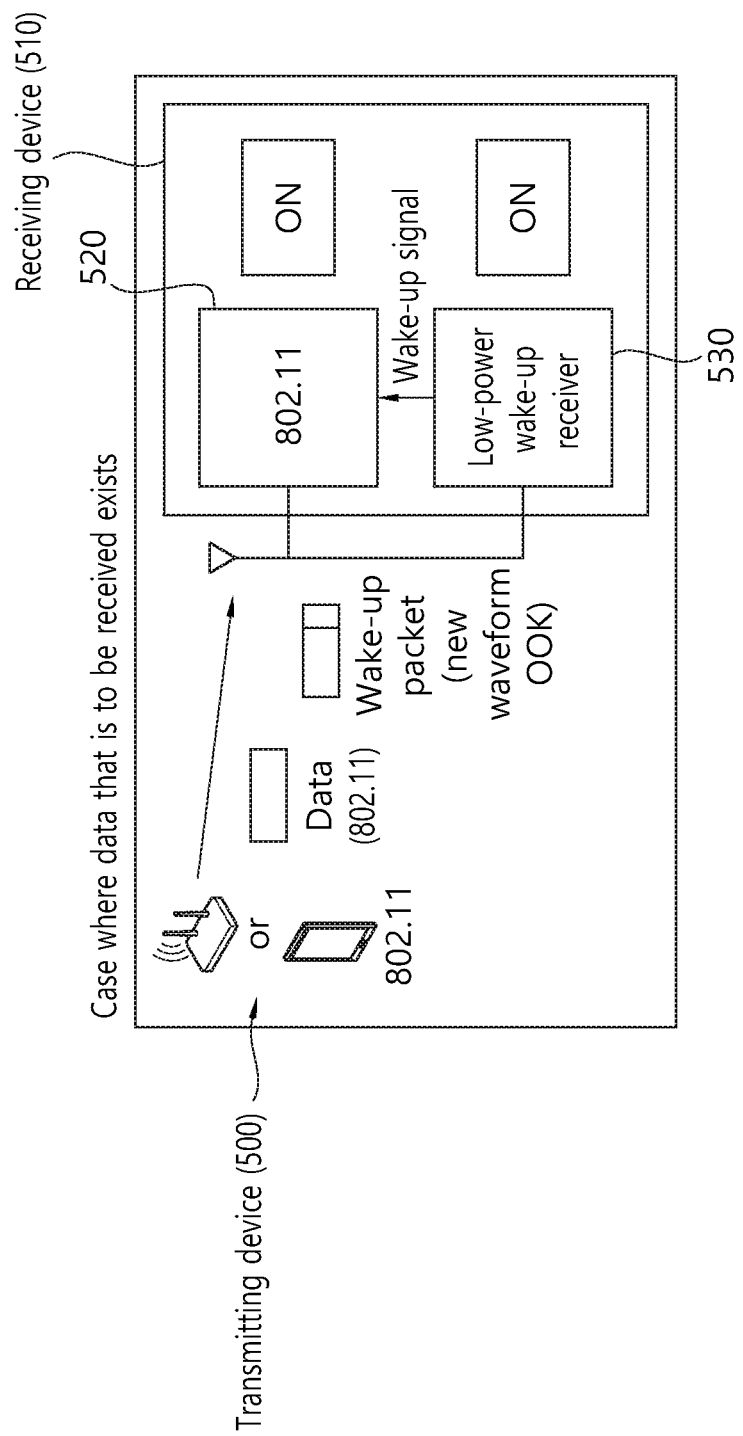
FIG. 5 is a diagram illustrating a low-power wake-up receiver in an environment where data is received.

FIG. 4 is a diagram illustrating a low-power wake-up receiver in an environment where data is not received. FIG. 5 is a diagram illustrating a low-power wake-up receiver in an environment where data is received.

As shown in FIG. 4 and FIG. 5, in case data that is to be transmitted and received exists, one of the methods for implementing the most ideal transmission and reception strategy is to add a low-power wake-up receiver (LP-WUR) that is capable of waking up a main radio, such as Wi-Fi, Bluetooth® radio, Bluetooth® Low Energy (BLE) radio, and so on.

Referring to FIG. 4, the Wi-Fi/BT/BLE radio (420) is turned off, and the low-power wake-up receiver (430) is turned on in a state where data is not received. According to part of the related studies, the power consumption of such low-power wake-up receiver (LP-WUR) may be less than 1 mW.

However, as shown in FIG. 5, if a wake-up packet is received, the low-power wake-up receiver (530) wakes up the entire (or whole) Wi-Fi/BT/BLE radio (520) so that a data packet following the wake-up packet can be accurately received. However, in some cases, actual data or an IEEE 802.11 MAC frame may be included in the wake-up packet. In this case, although the entire Wi-Fi/BT/BLE radio (520) cannot be woken up, the necessary process should be carried out by waking up only part of the Wi-Fi/BT/BLE radio (520). This may result in a considerable amount of power saving.

An exemplary technique that is described in this specification defines a method of a segmented wake-up mode for a Wi-Fi/BT/BLE radio using a low-power wake-up receiver. For example, actual data being included in a wake-up packet may be directly delivered to a memory block without waking up the Wi-Fi/BT/BLE radio.

As another example, in case an IEEE 802.11 MAC frame is included in the wake-up packet, only a MAC processor of the Wi-Fi/BT/BLE wireless device (or radio) needs to be woken up in order to process the IEEE 802.11 MAC frame, which is included in the wake-up packet. More specifically, the power of a PHY module of the Wi-Fi/BT/BLE radio may be turned off or maintained in a low-power mode.

Since a plurality of segmented wake-up modes for a Wi-Fi/BT/BLE radio using a low-power wake-up receiver are defined, when a wake-up packet is received, the power of the Wi-Fi/BT/BLE radio must be turned on. However, according to the exemplary embodiment of this specification, only a necessary (or required) part (or configuration element) of the Wi-Fi/BT/BLE radio may be selectively woken up, thereby saving a larger amount of energy and reducing stand-by (or waiting) time. A large number of solutions using the pow-power wake-up receiver wakes up the entire Wi-Fi/BT/BLE radio when receiving a wake-up packet. According to an exemplary aspect that is discussed in this specification, since only a part (or element) of the Wi-Fi/BT/BLE radio that is required for processing the receiving data is woken up, a considerable amount of energy is saved, and unnecessary stand-by (or waiting) time that is needed for waking up the main radio may be reduced.

Additionally, according to this exemplary embodiment, the low-power wake-up receiver (530) may wake up the main radio (520) based on the wake-up packet that is transmitted from a transmitting device (500).

Furthermore, the transmitting device (500) may be configured to transmit the wake-up packet to a receiving device (510). For example, the transmitting device (500) may instruct the low-power wake-up receiver (530) to wake up the main radio (520).

Figure 6:
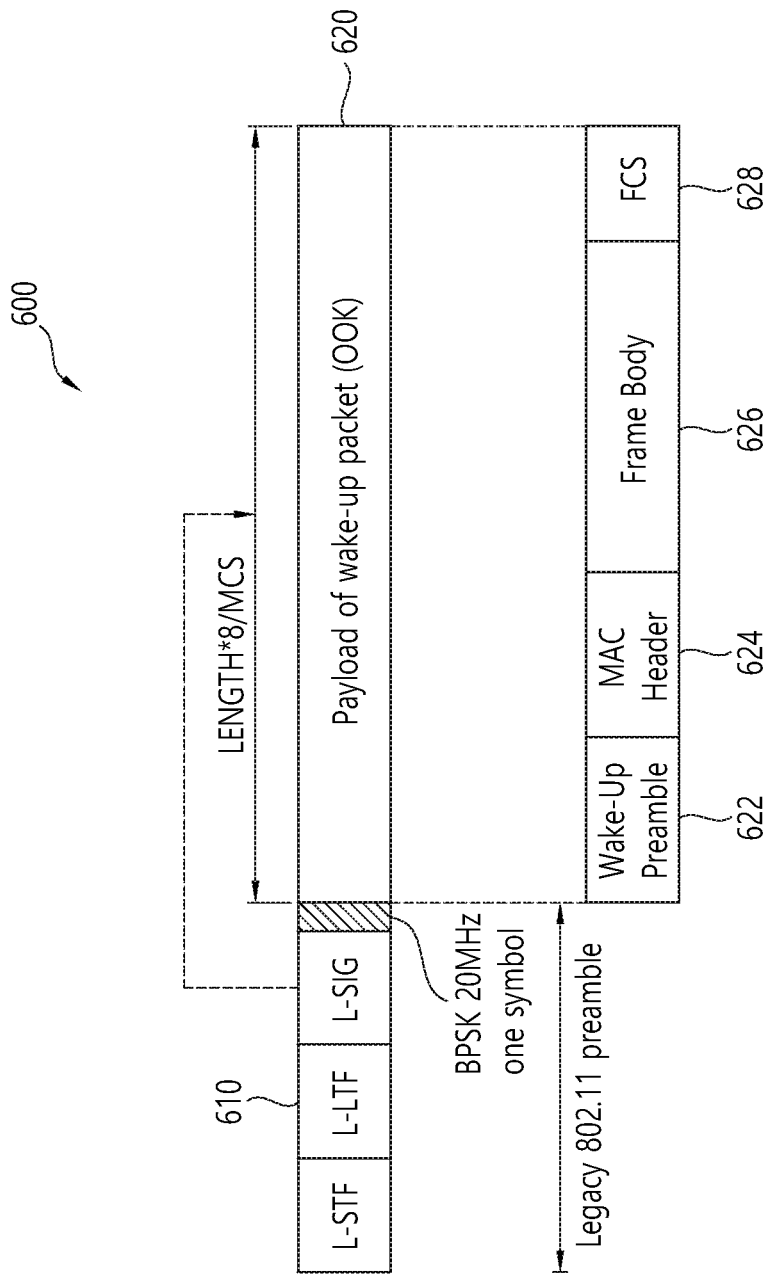
FIG. 6 illustrates an example of a wake-up packet structure according to an exemplary embodiment of this specification.

FIG. 6 illustrates an example of a wake-up packet structure according to an exemplary embodiment of this specification.

A wake-up packet may include one or more legacy preambles. One or more legacy devices may decode or process the legacy preamble(s).

Additionally, the wake-up packet may include a payload after a legacy preamble. The payload may be modulated by using a simple modulation scheme, e.g., an On-Off Keying (OOK) scheme.

Referring to FIG. 6, the transmitting device may be configured to generate and/or transmit a wake-up packet (600). And, the receiving device may be configured to process the received wake-up packet (600).

Additionally, the wake-up packet (600) may include a legacy preamble, which is defined by the IEEE 802.11 specification, or another random preamble (610). And, the wake-up packet (600) may also include a payload (620).

A legacy preamble provides a coexistence with a legacy STA. The legacy preamble (610) for the coexistence uses an L-SIG field for protecting the packet. Through the L-SIG field within the legacy preamble (610), an 802.11 STA may detect a beginning (or a start point) of the legacy preamble (610). And, through the L-SIG field within the legacy preamble (610), the 802.11 STA may know (or acknowledge) an end (or last part) of the packet. Additionally, by adding a symbol that is modulated by using BPSK after the L-SIG, a false alarm of an 802.11n terminal (or device) may be reduced. A symbol (4 us) that is modulated by using BPSK also has a 20 MHz bandwidth, just as the legacy part. The legacy preamble (610) corresponds to/is related with a field for a third party legacy STA (an STA not including an LP-WUR). The legacy preamble (610) is not decoded by the LP-WUR.

The payload (620) may include a wake-up preamble (622). The wake-up preamble (622) may include a sequence of bits that are configured to identify the wake-up packet (600). The wake-up preamble (622) may, for example, include a PN sequence.

Additionally, the payload (620) may include a MAC header (624) including address information of a receiving device, which receives the wake-up packet (600), or an identifier of the receiving device.

Additionally, the payload (620) may include a frame body (626), which may include other information of the wake-up packet. For example, length or size information of the payload may be included in the frame body (626).

Furthermore, the payload (620) may include a frame check sequence (FCS) field (628) including a cyclic redundancy check (CRC) value. For example, the FCS field (628) may include a CRC-8 value or a CRC-16 value of the MAC header (624) and the frame body (626).

Figure 7:
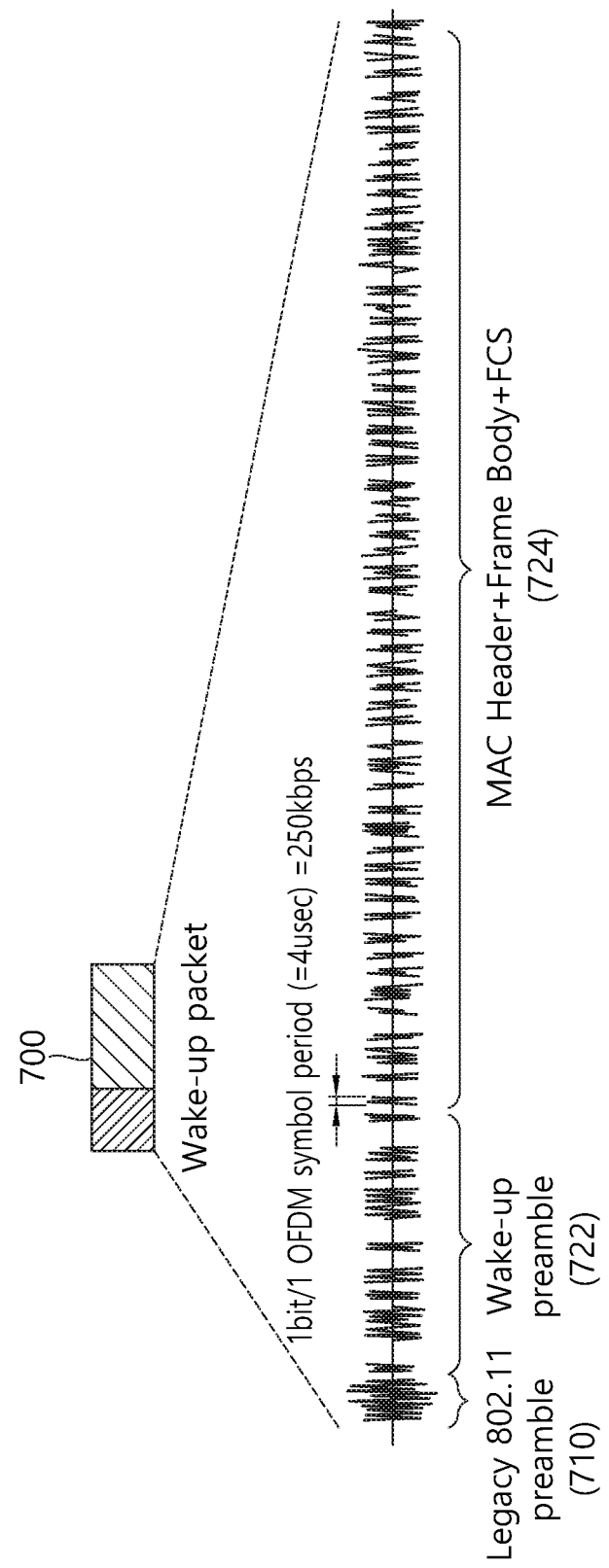
FIG. 7 illustrates a signal waveform of a wake-up packet according to an exemplary embodiment of this specification.

FIG. 7 illustrates a signal waveform of a wake-up packet according to an exemplary embodiment of this specification.

Referring to FIG. 7, a wake-up packet (700) includes a legacy preamble (802.11 preamble (710) and a payload being modulated by OOK. In other words, the wake-up packet (700) is configured of a format in which a legacy preamble and a new LP-WUR signal waveform coexist.

Additionally, the legacy preamble (710) may be modulated in accordance with an OFDM modulation scheme. More specifically, the OOK scheme is not applied to the legacy preamble (710). Conversely, the payload may be modulated in accordance with the OOK scheme. However, a wake-up preamble (722) within the payload may be modulated in accordance with a different modulation scheme.

If the legacy preamble (710) is transmitted within a channel bandwidth of 20 MHz in which 64 FFT is applied, the payload may be transmitted within a channel bandwidth of approximately 4.06 MHz. This will be described in more detail in the following description of an OOK pulse designing method.

Firstly, a modulation method using the OOK scheme and a Manchester coding method will be described in detail.

Figure 8:
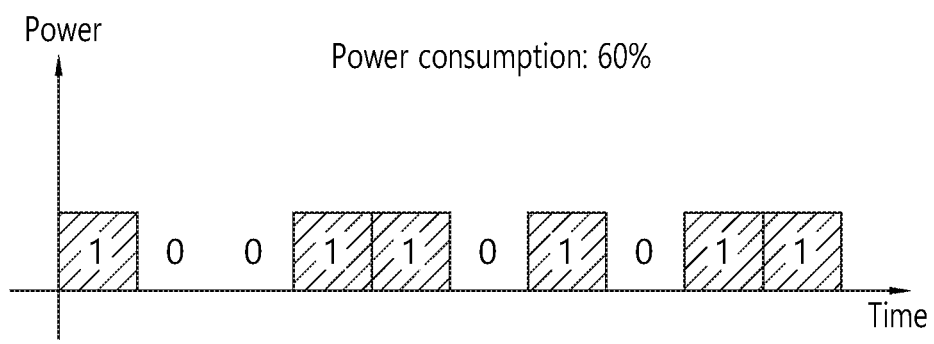
FIG. 8 illustrates a diagram for describing a principle for determining consumed power in accordance with a ratio between bit value 1 and 0 that configure information of a binary sequence format by using the OOK scheme.

FIG. 8 illustrates a diagram for describing a principle for determining consumed power in accordance with a ratio between bit value 1 and 0 that configure information of a binary sequence format by using the OOK scheme.

Referring to FIG. 8, information of a binary sequence format having 1 or 0 as the bit values is expressed in the drawing. By using such bit values of 1 or 0 of the binary sequence format information, an OOK modulation scheme communication may be carried out. More specifically, by considering the bit values of the binary sequence format information, the OOK modulation scheme communication may be carried out. For example, in case of using a light-emitting diode in visible light communication, in case the bit value configuring the binary sequence format information is equal to 1, the light-emitting diode is turned on, and, in case the bit value is equal to 0, the light-emitting diode is turned off. Thus, the light-emitting diode may be turned on and off (i.e., flicker). As the receiving device receives and recovers the data being transmitted in the form of visible light in accordance with the above-described on and off state (or flickering) of the light-emitting diode, the communication using visible light may be carried out. However, since the flickering of the light-emitting diode cannot be recognized by the human eye, people think and feel that the lighting is continuously maintained in the on state.

For simplicity in the description, as shown in FIG. 8, information of a binary sequence format having 10 bit values is used in this specification. Referring to FIG. 8, information of a binary sequence format having a value of '1001101011'. As described above, in case the bit value is equal to 1, the transmitting device is turned on, and, in case the bit value is equal to 0, the transmitting device is turned off. Accordingly, among the 10 bit values, the symbols are turned on in 6 bit values. In this case, given that 100% of the consumed power is used when all of the symbols are turned on in all of the 10 bit values, and, in case a duty cycle shown in FIG. 8 is followed, the consumed power is 60%.

More specifically, it may be said that the consumed power of the transmitter is determined in accordance with a ratio between 1s and 0s configuring the binary sequence format information. In other words, in case there is a constraint condition specifying that the consumed power of the transmitter should be maintained at a specific value, the ratio between the 1s and 0s configuring the binary sequence format information should also be maintained. For example, in case of a lighting device, since the lighting should be maintained at a specific luminance value that is wanted by the users, the ratio between the 1s and 0s configuring the binary sequence format information should also be maintained accordingly.

However, for the wake-up receiver (WUR), since the receiving device is the subject, the transmission power is not significantly important. One of the main reasons for using the OOK is because the amount of consumed power during the decoding of a received signal is considerably small. Before performing the decoding, the difference between the amount of consumed power in the main radio and in the WUR is small. However, as the decoding process is carried out, the difference in the amount of consumed power becomes apparent. The approximate amount of consumed power is as shown below.

The current Wi-Fi power consumption is approximately 100 mW. More specifically, power may be consumed as follows: Resonator+Oscillator+PLL (1500 uW)→LPF (300 uW)→ADC (63 uW)→decoding processing (OFDM receiver) (100 mW).

However, the WUR power consumption is approximately 1 mW. More specifically, power may be consumed as follows: Resonator+Oscillator (600 uW)→LPF (300 uW)→ADC(20 uW)→decoding processing (Envelope detector) (1 uW).

Figure 9:
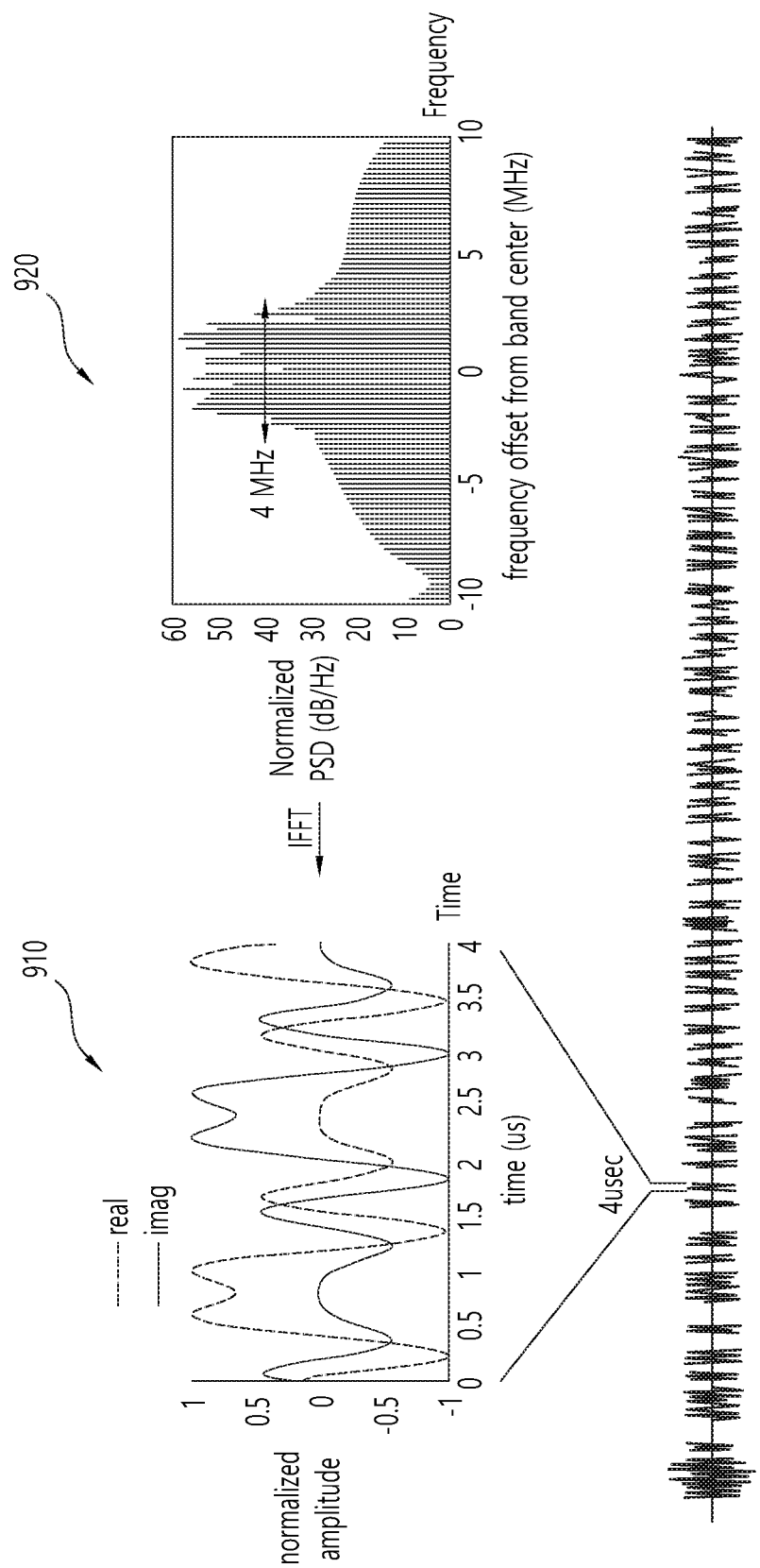
FIG. 9 illustrates a method for designing an OOK pulse according to an exemplary embodiment of this specification.

FIG. 9 illustrates a method for designing an OOK pulse according to an exemplary embodiment of this specification.

In order to generate an OOK pulse, an OFDM transmitting device of 802.11 may be re-used. The transmitting device may generate a sequence having 64 bits by applying 64-point FFT, just as in the legacy 802.11.

The transmitting device should generate the payload of a wake-up packet by performing modulation using the OOK scheme. However, since the wake-up packet is used for low-power communication, the OOK scheme is applied to the ON-signal. Herein, the ON-signal corresponds to/is related with a signal having the actual power value, and an OFF-signal corresponds to/is related with a signal that does not have an actual power value. Although the OOK scheme is also applied to the OFF-signal, since the OFF-signal is not a signal that is generated by using the transmitting device, and, accordingly, since the signal is not actually transmitted, the OFF-signal is not considered when generating the wake-up packet.

In the OOK scheme, Information (bit) 1 may correspond to the ON-signal, and Information (bit) 0 may correspond to the OFF-signal. On the other hand, if the Manchester coding method is applied, it may be indicated that Information 1 is shifted from the OFF-signal to the ON-signal, and that Information 0 is shifted from the ON-signal to the OFF-signal. Conversely, it may also be indicated that Information 1 is shifted from the ON-signal to the OFF-signal, and that Information 0 is shifted from the OFF-signal to the ON-signal. The Manchester coding method will be described later on in detail.

Referring to FIG. 9, as shown in the right side frequency domain graph (920), the transmitting device selects 13 consecutive subcarriers of the reference band, 20 MHz band, as a sample and applies a sequence. In FIG. 9, among the subcarriers of the 20 MHz band, the 13 subcarriers that are located in the middle are selected as the sample. More specifically, among the 64 subcarriers, the transmitting device selects subcarriers having subcarriers indexes ranging from −6 to +6. At this point, since subcarrier index 0 is a DC subcarrier, this subcarrier may be nulled as 0. A specific sequence is configured only in the sample of the selected 13 subcarriers, and all of the remaining subcarriers excluding the 13 selected subcarriers (subcarrier indexes ranging from −32 to −7 and subcarrier indexes ranging from +7 to +31) are set to 0.

Additionally, since subcarrier spacing corresponds to/is related with 312.5 KHz, the 13 subcarriers have a channel bandwidth of approximately 4.06 MHz. More specifically, it may be understood that, in the 20 MHz band of the frequency domain, power exists only in 4.06 MHz. Thus, as described above, by focusing the power to the center, it will be advantageous in that a Signal to Noise Ratio (SNR) may be increased, and that power consumption in an AC/DC converter of the receiving device may be reduced. Additionally, since the sampling frequency band is reduced to 4.06 MHz, the amount of the consumed power may be reduced accordingly.

Additionally, as shown in the left side time domain graph (910), the transmitting device performs 64-point IFNT on the 13 subcarriers, so as to generate one ON-signal in the time domain. One ON-signal has the size of 1 bit. More specifically, a sequence being configured of 13 subcarriers may correspond to 1 bit. Conversely, the transmitting device may bot transmit the OFF-signal at all. By performing IFFT, a symbol of 3.2 us may be generated, and, if a cyclic prefix (CP) (0.8 us) is included, one symbol having the length of 4 us may be generated. More specifically, 1 bit indicating one ON-signal may be loaded in one symbol.

The reason for configuring and transmitting a bit, as described in the above-described exemplary embodiment, is to reduce power consumption in the receiving device by using an envelope detector. Thus, the receiving device may decode a packet with a minimum amount of power.

However, a basic data rate for one information may correspond to 125 Kbps (8 us) or 62.5 Kbps (16 us).

By generalizing the description presented above, a signal being transmitted from the frequency domain is as described below. More specifically, each signal having a length of K within the 20 MHz band may be transmitted by being loaded in K number of consecutive subcarriers, among the total of 64 subcarriers. More specifically, as a number of subcarriers being used for transmitting a signal, the value K may correspond to the bandwidth of an OOK pulse. Coefficients of subcarriers other than the K number of subcarriers are equal to 0. At this point, indexes of the K number of subcarriers being used by a signal corresponding to information 0 and information 1 are the same. For example, a subcarrier index that is being used may be indicated as 33-floor(K/2): 33+ceil(K/2)−1.

At this point, Information 1 and Information 0 may have the following values.

Information 0=zeros(1,K)
Information 1=alpha*ones(1,K)

The alpha is a power normalization factor and may, for example, be equal to 1/sqrt(K).

Figure 10:
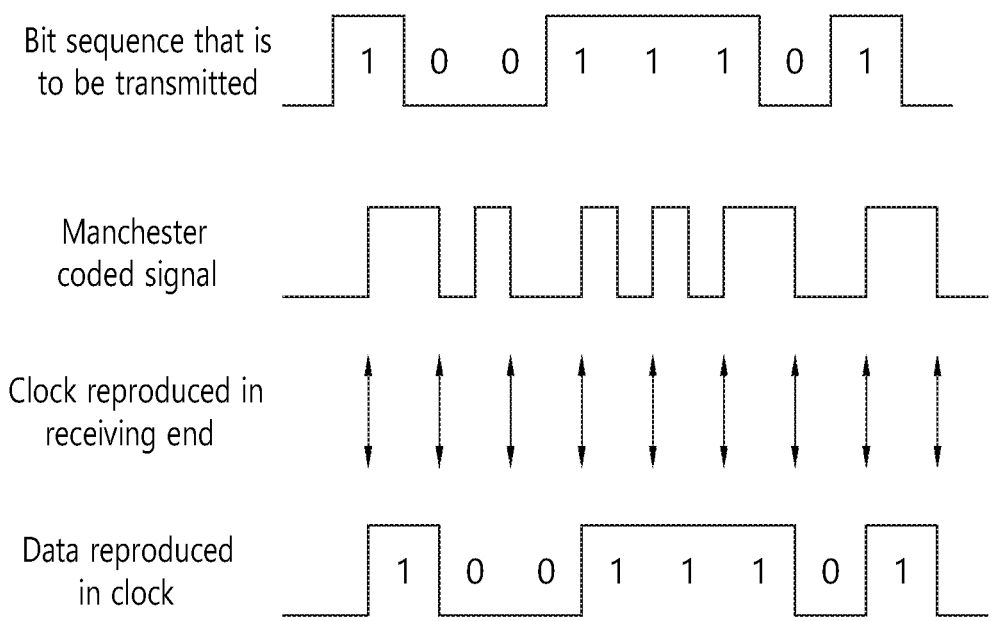
FIG. 10 is a descriptive diagram of a Manchester coding method according to an exemplary embodiment of this specification.

FIG. 10 is a descriptive diagram of a Manchester coding method according to an exemplary embodiment of this specification.

Manchester coding is a type of line coding that corresponds to/is related with a coding method in which a transition in a magnitude value occurs at a midpoint of one bit period. And, information of this method may be indicated as shown below in the following table.

TABLE 1

| Original data | Clock | | Manchester value |
|---|---|---|---|
| 0 = | 0 | XOR | 0 |
| | 1 | | 1 |
| 1 | 0 | | 1 |
| | 1 | | 0 |

More specifically, the Manchester coding method (or technique) refers to a method of converting data from 1 to 01 and from 0 to 10 or from 1 to 10 and from 0 to 01. Table 1 shows an example of data being converted from 1 to 10 and from 0 to 01 by using Manchester coding.

As shown in FIG. 10, from top to bottom, the drawing illustrates a bit sequence that is to be transmitted, a Manchester coded signal, a clock that is reproduced by the receiving end, and data that is reproduced by the clock.

If data is transmitted from the transmitting end by using the Manchester coding method, the receiving end reads the data after a brief moment based on a transition point, wherein transition of 1→0 or 0→1 occurs. Then, after recovering the data and recognizing the transition point of transitioning 1→0 or 0→1 as the transition point of the block, the clock is recovered. Alternatively, when a symbol is divided based on the transition point, a simple decoding may be performed by comparing the power level of the front part of the symbol and the power level of the back part of the symbol based on the midpoint of the symbol.

As shown in FIG. 10, the bit sequence that is to be transmitted corresponds to/is related with 10011101, and the bit sequence that is to be transmitted being processed with Manchester coding corresponds to/is related with 0110100101011001, the clock that is reproduced in the receiving end recognizes a transition point of the Manchester-coded signal as the transition point of the block, and, then, data is recovered by using the clock, which is reproduced as described above.

When using the above-described Manchester coding method, communication may be carried out in a synchronization method by using only a data transmission channel and without using a separate clock.

Additionally, in the above-described, by using only the data transmission channel, a TXD pin may be used for data transmission, and an RXD pin may be used for data reception. Therefore, a synchronized two-way transmission may be performed.

This specification proposes diverse symbol types that can be used in a WUR and the corresponding data rate.

Since STAs requiring robust performance (or capacity) and STAs receiving intense signals from an AP are intermixed, depending upon the situation, supporting an efficient data rate is needed. In order to achieve a reliable and robust performance, a symbol-based Manchester coding method and a symbol repetition method may be used. Additionally, in order to achieve a high data rate, a symbol reduction method may be used.

At this point, each symbol may be generated by using the legacy 802.11 OFDM transmitter. And, the number of subcarriers that are used for generating each symbol may be equal to 13. However, the number of subcarriers will not be limited only to this.

Additionally, each symbol may use OOK modulation, which is configured of an ON-signal and an OFF-signal.

A symbol that is generated for the WUR may be configured of a cyclic prefix (CP) (or a guard interval (GI)) and a signal part indicating actual information. By diversely configuring the lengths of the CP and the actual information signal, or by repeating the CP and the actual information part, a symbol having diverse data rates may be designed.

Diverse example related to the symbol types are shown below.

For example, a basic WUR symbol may be indicated as CP+3.2 us. More specifically, 1 bit is indicated by using a symbol having the same length as the legacy Wi-Fi. Most particularly, the transmitting device performs IFFT after applying a specific sequence to all of the subcarriers that are available for usage (e.g., 13 subcarrier), thereby configuring an information signal part of 3.2 us. At this point, among all of the subcarriers that are available for usage, a coefficient of 0 may be loaded in a DC subcarrier or middle subcarrier index.

Different sequence may be applied to the subcarriers that are available for usage in accordance with a 3.2 us ON-signal and a 3.2 us OFF-signal. The 3.2 us OFF-signal may be generated by applying 0s to all of the coefficients.

The CP may select and use a part corresponding having a specific length at an end part of the information signal 3.2 us that immediately follows the CP. At this point, the CP may correspond to 0.4 us or 0.8 us. This length corresponds to/is related with the same length as the guard interval of 802.11ac.

Therefore, a 1-bit information corresponding to one basic WUR symbol may be indicated as shown below in the following table.

TABLE 2

| Information '0' | Information '1' |
|---|---|
| 3.2 us OFF-signal | 3.2 us ON-signal |

Table 2 does not separately indicate the CP. Actually, when including the CP, CP+3.2 us may indicate one 1-bit information. More specifically, the 3.2 us ON-signal may be regarded as a (CP+3.2 us) ON-signal, and the 3.2 us OFF-signal may be regarded as a (CP+3.2 us) OFF-signal.

For example, a symbol having Manchester coding applied thereto may be indicated as CP+1.6 us+CP+1.6 us or CP+1.6 us+1.6 us. The symbol having Manchester coding applied thereto may be generated as described below.

In an OOK transmission using a Wi-Fi transmitting device, the time period used for transmitting one bit (or symbol) excluding the guard interval of the transmitted signal is equal to 3.2 us. At this point, if Manchester coding is also applied, a shift in the signal size (or magnitude) should occur in 1.6 us. More specifically, each sub-information having a length of 1.6 us should be given a value of 0 or 1, and the corresponding signal may be configured by using the method described below.

Information 0→1 0 (Each may be referred to as sub-information 1 0 or sub-symbol 1 (ON) 0 (OFF).)

First 1.6 us (sub-information 1 or sub-symbol 1): Sub-information 1 may be given a value of beta*ones(1,K). Herein, the beta indicates/is related with a power normalization element and may, for example, be equal to 1/sqrt(ceil(K/2)).

Additionally, in order to generate the symbol having Manchester coding applied thereto, a specific sequence is applied to all subcarriers that are available for usage (e.g., 13 subcarriers) in units of 2 spaces. More specifically, each even-number indexed subcarrier of the specific pattern is nulled by using 0. For example, when it is assumed that an ON-signal is configured by using 13 subcarriers, the specific sequence having a coefficient at an interval of 2 spaces may correspond to {a 0 b 0 c 0 d 0 e 0 f 0 g}, {0 a 0 b 0 c 0 d 0 e 0 f 0}, or {a 0 b 0 c 0 0 0 d 0 e 0 f}. At this point, a, b, c, d, e, f, g may correspond to 1 or −1.

More specifically, among the 64 subcarriers, the transmitting device maps the specific sequence to K number of consecutive subcarriers (e.g., 33-floor(K/2): 33+ceil(K/2)−1) and sets a coefficient of 0 for the remaining subcarriers. Thereafter, the transmitting device performs IFFT. Thus, a time domain signal may be generated. Since the time domain signals has coefficients existing at an interval of 2 spaces within the frequency domain, the time domain signal corresponds to/is related with a 3.2 us-length signal of having a cycle of 1.6 us. One of a first 1.6 us-cycle signal and a second 1.6 us-cycle signal may be selected and used as sub-information 1.

Second 1.6 us (sub-information 0 or sub-symbol 0): Sub-information 0 may be given a value of zeros(1,K). Similarly, among the 64 subcarriers, the transmitting device maps the specific sequence to K number of consecutive subcarriers (e.g., 33-floor(K/2): 33+ceil(K/

2)−1) and performs IFFT, thereby generating a time domain signal. Sub-information 0 may correspond to a 1.6 us OFF-signal. The 1.6 us OFF-signal may be generated by setting all of the coefficients to 0.

One of a first 1.6 us-cycle signal and a second 1.6 us-cycle signal of the time domain may be selected and used as sub-information 0. Simply, zero signals (1,32) may also be used as sub-information 0.

Information 1→0 1(Each may be referred to as sub-information '0', '1' or sub-symbol 0 (OFF) 1 (ON).)

Since Information 1 is also divided into a first 1.6 us (sub-information 0) and a second 1.6 us (sub-information 1), a signal corresponding to each sub-information may be configured by using the same method as the method for generating Information 0.

When performing the method for generating Information 0 and Information 1 by using Manchester coding, a consecutive occurrence of OFF-symbols may be prevented as compared to the legacy method. Accordingly, a problem of coexistence with the legacy Wi-Fi device does not occur. The problem of coexistence refers to a problem that occurs when another device transmits a signal after determining that the channel is in a channel idle state, due to the existence of consecutive OFF-symbols. If the OOK modulation is only used, the sequence may, for example, correspond to 100001, wherein the OFF-symbol occurs consecutively. However, if Manchester coding is used, the sequence may correspond to 100101010110, wherein the OFF-symbols cannot be consecutive.

According to the description provided above, the sub-information may be referred to as a 1.6 us information signal. The 1.6 us information signal may correspond to a 1.6 us ON-signal or a 1.6 us OFF-signal. The 1.6 us ON-signal and the 1.6 OFF-signal may have different sequences applied thereto in each subcarrier.

The CP may select and use a part corresponding having a specific length at an end part of the information signal 1.6 us that immediately follows the CP. At this point, the CP may correspond to 0.4 us or 0.8 us. This length corresponds to/is related with the same length as the guard interval of 802.11ac.

Therefore, a 1-bit information corresponding to a symbol having Manchester coding applied thereto may be indicated as shown below in the following table.

TABLE 3

| Information '0' | Information '1' |
|---|---|
| 1.6 us ON-signal + 1.6 us OFF-signal or 1.6 us OFF-signal + 1.6 us ON-signal | 1.6 us OFF-signal + 1.6 us ON-signal or 1.6 us ON-signal + 1.6 us OFF-signal |

Table 3 does not separately indicate the CP. Actually, when including the CP, CP+1.6 us+CP+1.6 us or CP+1.6 us+1.6 us may indicate one 1-bit information. More specifically, in case of the former structure, the 1.6 us ON-signal and the 1.6 us OFF-signal may be respectively regarded as a (CP+1.6 us) ON-signal and a (CP+1.6 us) OFF-signal.

As yet another example, proposed herein is a method for generating a wake-up packet by repeating symbols in order to enhance performance.

A symbol repetition method is applied to a wake-up payload (724). The symbol repetition method refers to a repetition of time signals after IFFT and cyclic prefix (CP)

insertion in each symbol. Thus, the length (time (or duration)) of the wake-up payload (724) becomes two times its initial length.

More specifically, a method for generating a wake-up packet by applying a symbol, which indicates information such as Information 0 or Information 1, to a specific sequence and by repeating this process is proposed as described below.

Option 1: Information 0 and Information 1 may be indicated by being repeated as the same symbol.

Information 0→0 0 (Information 0 is repeated 2 times)

Information 1→1 1 (Information 1 is repeated 2 times)

Option 2: Information 0 and Information 1 may be indicated by being repeated as different symbols.

Information 0→0 1 or 1 0 (Information 0 and Information 1 are repeated)

Information 1→1 0 or 0 1 (Information 1 and Information 0 are repeated)

Hereinafter, a method of decoding a signal, by a receiving device, being transmitted from a transmitting device after applying the symbol repetition method will be described in detail.

The transmitted signal may correspond to a wake-up packet, and a method for decoding the wake-up packet may be broadly divided into two different types. A first type corresponds to a non-coherent detection method, and a second type corresponds to a coherent detection method. The non-coherent detection method refers to a method wherein a phase relation between signals of the transmitting device and the receiving device is not fixed. Therefore, the receiving device is not required to measure and adjust the phase of the received signal. Conversely, in the coherent detection method, the phase between the signals of the transmitting device and the receiving device is required to be matched.

The receiving device includes the above-described low-power wake-up receiver. In order to reduce power consumption, the low-power wake-up receiver may decode a packet (wake-up packet), which is transmitted by using the OOK modulation scheme, by using an envelope detector.

The envelope detector uses a method of decoding a received signal by measuring the power or magnitude of the corresponding signal. The receiving device determines in advance a threshold value based on the power or magnitude of the received signal, which is measured by using the envelope detector. Thereafter, when the receiving device decodes the symbol having OOK applied thereto, if the symbol is greater than or equal to the threshold value, the symbol is determined as Information 1, and, if the symbol is smaller than the threshold value, the symbol is determined as Information 0.

A method for decoding a symbol having the symbol repetition method applied thereto is as described below. In the above-described Option 1, the receiving device may calculate the power corresponding to a case where Symbol 1 (symbol including Information 1) is transmitted by using a wake-up preamble (722) and may use the calculated power to determine a threshold value.

More specifically, when an average power level between two symbols is calculated, and, if the calculated average power level is equal to or greater than the threshold value, the symbol is determined as Information 1(1 1). And, if the calculated average power level is equal to or smaller than the threshold value, the symbol is determined as Information 0 (0 0).

Additionally, in the above-described Option 2, the information may be determined by comparing the power levels of the two symbols without performing the process of determining the threshold value.

More specifically, when it is given that Information 1 is configured of 0 1 and that Information 0 is configured of 1 0, if the power level of a first symbol is greater than the power level of a second symbol, the information is determined as Information 0. Conversely, if the power level of the first symbol is smaller than the power level of the second symbol, the information is determined as Information 1.

The order of the symbols may be reconfigured by an interleaver. Herein, the interleaver may be applied in packet units and units of a specific number of symbols.

Moreover, in addition to two symbols, the symbol repetition may be extended by using n number of symbols, as described below. FIG. 11 illustrates various examples of a symbol repetition method repeating n number of symbols according to an exemplary embodiment of this specification.

Option 1: As described in FIG. 11, Information 0 and Information 1 may be indicated by being repeated n number of times as the same symbol.

Information 0→0 0 . . . 0 (Information 0 is repeated n number of times)

Information 1→1 1 . . . 1 (Information 1 is repeated n number of times)

Option 2: As described in FIG. 11, Information 0 and Information 1 may be indicated by being repeated n number of times as different symbols.

Information 0→0 1 0 1 . . . or 1 0 1 0 . . . (Information 0 and Information 1 are alternately repeated n number of times)

Information 1→1 0 1 0 . . . or 0 1 0 1 . . . (Information 1 and Information 0 are alternately repeated n number of times)

Option 3: As described in FIG. 11, n number of symbols may be indicated by configuring one half of the symbols of Information 0 and by configuring another half of the symbols of Information 1.

Information 0→0 0 . . . 1 1 . . . or 1 1 . . . 0 0 . . . (n/2 number of symbols is configured of Information 0, and the remaining n number of symbols is configured of Information 1)

Information 1→1 1 . . . 0 0 . . . or 0 0 . . . 1 1 . . . (n/2 number of symbols is configured of Information 0, and the remaining n number of symbols is configured of Information 1)

Option 4: As described in FIG. 11, when n is an odd number, a total of n number of symbols may be indicated by differentiating a number of Symbol 1's (symbol including Information 1) and a number of Symbol 0's (symbols including Information 0) from one another.

Information 0→n number of symbols configured of an odd number of Symbol 1's and an even number of Symbol 0's, or n number of symbols configured of an even number of Symbol 1's and an odd number of Symbol 0's Information 1→n number of symbols configured of an odd number of Symbol 0's and an even number of Symbol 1's, or n number of symbols configured of an even number of Symbol 0's and an odd number of Symbol 1's Additionally, the order of the symbols may be reconfigured by an interleaver. Herein, the interleaver may be applied in packet units and units of a specific number of symbols.

Moreover, as described above, the receiving device may determine the symbol (or information) as Information 0 or Information 1 by determining the threshold value and comparing the power levels of n number of symbols.

However, if consecutive Symbol 0's (or OFF-signals) are used, a problem of coexistence with the legacy Wi-Fi device and/or another device may occur. The problem of coexistence refers to a problem that occurs when another device transmits a signal after determining that the channel is in a channel idle state, due to the existence of consecutive OFF-symbols. Therefore, in order to resolve the problem of coexistence, since it is preferable to avoid the usage of consecutive OFF-signals, the method proposed in Option 2 may be preferred.

Additionally, this may be extended to a method of expressing m number of information sets by using n number of symbols. In this case, the first or last m number of information sets may be indicated as symbols 0 (OFF) or 1 (ON) in accordance with the corresponding information sets, and n-m number of redundant symbols 0 (OFF) or 1 (ON) may be consecutively configured after or before the first or last m number of information sets.

For example, if a code rate of ¾ is applied to information 010, the information may correspond to 1,010 or 010,1 or 0,010 or 010,0. However, in order to prevent the usage of consecutive OFF symbols, it may be preferable to apply a code rate of ½ or less.

Similarly, in this exemplary embodiment, the order of the symbols may be reconfigured by an interleaver. Herein, the interleaver may be applied in packet units and units of a specific number of symbols.

Hereinafter, various exemplary embodiments of a symbol having the symbol repetition method applied thereto will be described in detail.

Generally, a symbol having the symbol repetition method applied thereto may be indicated as n number of (CP+3.2 us) or CP+n number of (1.6 us).

As shown in FIG. 11, 1 bit is indicated by using n (n>=2) number of information signals (symbols), and, after applying a specific sequence to all of the subcarriers that are available for usage (e.g., 13 subcarriers), IFFT is performed so as to configure an information signal (symbol) of 3.2 us.

Different sequences may be applied to the subcarriers that are available for usage in accordance with a 3.2 us ON-signal and a 3.2 us OFF-signal. The 3.2 us OFF-signal may be generated by applying 0s to all of the coefficients.

The CP may select and use a part corresponding having a specific length at an end part of the information signal 3.2 us that immediately follows the CP. At this point, the CP may correspond to 0.4 us or 0.8 us. This length corresponds to the same length as the guard interval of 802.11ac.

Therefore, a 1-bit information corresponding to a general symbol having the symbol repetition method applied thereto may be indicated as shown below in the following table.

TABLE 4

| Information '0' | Information '1' |
| --- | --- |
| All 3.2 us OFF-signals or two specific consecutive signals are 3.2 us ON-signal + 3.2 us OFF-signal, and the remaining signals are all ON or all OFF or two specific consecutive signals are 3.2 us OFF-signal + 3.2 us ON-signal, and the | All 3.2 us ON-signals or two specific consecutive signals are 3.2 us OFF-signal + 3.2 us ON-signal, and the remaining signals are all ON or all OFF or two specific consecutive signals are 3.2 us ON-signal + 3.2 us OFF-signal, and the |

TABLE 4-continued

| Information '0' | Information '1' |
| --- | --- |
| remaining signals are all ON or all OFF or a specific number (or ceil(n/2) number or floor(n/2) number) of signals located at specific positions are 3.2 us OFF-signals, and the remaining signals are 3.2 us ON-signals Ex) ON + OFF + ON + OFF . . . | remaining signals are all ON or all OFF or a specific number (or ceil(n/2) number or floor(n/2) number) of signals located at specific positions are 3.2 us ON-signals, and the remaining signals are 3.2 us OFF-signals Ex) OFF + ON + OFF + ON + OFF . . . |

Table 4 does not separately indicate the CP. Actually, when including the CP, n number of (CP+3.2 us) or CP+n number of (3.2 us) may indicate one 1-bit information. More specifically, in case of the n number of (CP+3.2 us), the 3.2 us ON-signal may be regarded as a (CP+3.2 us) ON-signal, and the 3.2 us OFF-signal may be regarded as a (CP+3.2 us) OFF-signal.

As another example, a symbol having the symbol repetition method applied thereto may be indicated as CP+3.2 us+CP+3.2 us or CP+3.2 us+3.2 us.

According to this exemplary embodiment, 1 bit is indicated by using two information signals (symbols), and, after applying a specific sequence to all of the subcarriers that are available for usage (e.g., 13 subcarriers), IFFT is performed so as to configure an information signal (symbol) of 3.2 us.

Different sequences may be applied to the subcarriers that are available for usage in accordance with a 3.2 us ON-signal and a 3.2 us OFF-signal. The 3.2 us OFF-signal may be generated by applying 0s to all of the coefficients.

The CP may select and use a part corresponding having a specific length at an end part of the information signal 3.2 us that immediately follows the CP. At this point, the CP may correspond to 0.4 us or 0.8 us. This length corresponds to the same length as the guard interval of 802.11ac.

Therefore, a 1-bit information corresponding to a symbol having the symbol repetition method applied thereto may be indicated as shown below in the following table.

TABLE 5

| Information '0' | Information '1' |
| --- | --- |
| 3.2 us OFF-signal + 3.2 us OFF-signal or 3.2 us ON-signal + 3.2 us OFF-signal or 3.2 us OFF-signal + 3.2 us ON-signal | 3.2 us ON-signal + 3.2 us ON-signal or 3.2 us OFF-signal + 3.2 us ON-signal or 3.2 us ON-signal + 3.2 us OFF-signal |

Table 5 does not separately indicate the CP. Actually, when including the CP, CP+3.2 us+CP+3.2 us or CP+3.2 us+3.2 us may indicate one 1-bit information. More specifically, in case of CP+3.2 us+CP+3.2 us, the 3.2 us ON-signal may be regarded as a (CP+3.2 us) ON-signal, and the 3.2 us OFF-signal may be regarded as a (CP+3.2 us) OFF-signal.

As yet another example, a symbol having the symbol repetition method applied thereto may be indicated as CP+3.2 us+CP+3.2 us+CP+3.2 us or CP+3.2 us+3.2 us+3.2 us.

According to this exemplary embodiment, 1 bit is indicated by using three information signals (symbols), and, after applying a specific sequence to all of the subcarriers that are available for usage (e.g., 13 subcarriers), IFFT is performed so as to configure an information signal (symbol) of 3.2 us.

Different sequences may be applied to the subcarriers that are available for usage in accordance with a 3.2 us ON-signal and a 3.2 us OFF-signal. The 3.2 us OFF-signal may be generated by applying 0s to all of the coefficients.

The CP may select and use a part corresponding having a specific length at an end part of the information signal 3.2 us that immediately follows the CP. At this point, the CP may correspond to 0.4 us or 0.8 us. This length corresponds to the same length as the guard interval of 802.11ac.

Therefore, a 1-bit information corresponding to a symbol having the symbol repetition method applied thereto may be indicated as shown below in the following table.

TABLE 6

| Information '0' | Information '1' |
| --- | --- |
| 3.2 us OFF-signal + | 3.2 us ON-signal + |
| 3.2 us OFF-signal + | 3.2 us ON-signal + |
| 3.2 us OFF-signal | 3.2 us ON-signal |
| or 3.2 us ON-signal + | or 3.2 us ON-signal + |
| 3.2 us ON-signal + | 3.2 us OFF-signal + |
| 3.2 us OFF-signal | 3.2 us ON-signal |
| or 3.2 us ON-signal + | or 3.2 us ON-signal + |
| 3.2 us OFF-signal + | 3.2 us ON-signal + |
| 3.2 us ON-signal | 3.2 us OFF-signal |
| or 3.2 us ON-signal + | or 3.2 us OFF-signal + |
| 3.2 us OFF-signal + | 3.2 us ON-signal + |
| 3.2 us ON-signal | 3.2 us OFF-signal |

Table 6 does not separately indicate the CP. Actually, when including the CP, CP+3.2 us+CP+3.2 us+CP+3.2 us or CP+3.2 us+3.2 us+3.2 us may indicate one 1-bit information. More specifically, in case of CP+3.2 us+CP+3.2 us+CP+3.2 us, the 3.2 us ON-signal may be regarded as a (CP+3.2 us) ON-signal, and the 3.2 us OFF-signal may be regarded as a (CP+3.2 us) OFF-signal.

As yet another example, a symbol having the symbol repetition method applied thereto may be indicated as CP+3.2 us+CP+3.2 us+CP+3.2 us+CP+3.2 us or CP+3.2 us+3.2 us+3.2 us+3.2 us.

According to this exemplary embodiment, 1 bit is indicated by using four information signals (symbols), and, after applying a specific sequence to all of the subcarriers that are available for usage (e.g., 13 subcarriers), IFFT is performed so as to configure an information signal (symbol) of 3.2 us.

Different sequences may be applied to the subcarriers that are available for usage in accordance with a 3.2 us ON-signal and a 3.2 us OFF-signal. The 3.2 us OFF-signal may be generated by applying 0s to all of the coefficients.

The CP may select and use a part corresponding having a specific length at an end part of the information signal 3.2 us that immediately follows the CP. At this point, the CP may correspond to 0.4 us or 0.8 us. This length corresponds to the same length as the guard interval of 802.11ac.

Therefore, a 1-bit information corresponding to a symbol having the symbol repetition method applied thereto may be indicated as shown below in the following table.

TABLE 7

| Information '0' | Information '1' |
| --- | --- |
| 3.2 us OFF-signal + | 3.2 us ON-signal + |
| 3.2 us OFF-signal + | 3.2 us ON-signal + |
| 3.2 us OFF-signal + | 3.2 us ON-signal + |
| 3.2 us OFF-signal | 3.2 us ON-signal |
| or 3.2 us ON-signal + | or 3.2 us ON-signal + |
| 3.2 us ON-signal + | 3.2 us ON-signal + |
| 3.2 us ON-signal + | 3.2 us OFF-signal + |

TABLE 7-continued

| Information '0' | Information '1' |
| --- | --- |
| 3.2 us OFF-signal | 3.2 us ON-signal |
| or 3.2 us ON-signal + | or 3.2 us ON-signal + |
| 3.2 us ON-signal + | 3.2 us ON-signal + |
| 3.2 us OFF-signal + | 3.2 us ON-signal + |
| 3.2 us ON-signal | 3.2 us OFF-signal |
| or 3.2 us ON-signal + | or 3.2 us ON-signal + |
| 3.2 us ON-signal + | 3.2 us OFF-signal + |
| 3.2 us OFF-signal + | 3.2 us ON-signal + |
| 3.2 us ON-signal | 3.2 us ON-signal |
| or 3.2 us ON-signal + | or 3.2 us ON-signal + |
| 3.2 us OFF-signal + | 3.2 us ON-signal + |
| 3.2 us ON-signal + | 3.2 us OFF-signal + |
| 3.2 us ON-signal | 3.2 us ON-signal |
| or 3.2 us ON-signal + | or 3.2 us OFF-signal + |
| 3.2 us OFF-signal + | 3.2 us ON-signal + |
| 3.2 us ON-signal + | 3.2 us OFF-signal + |
| 3.2 us OFF-signal | 3.2 us ON-signal |
| or 3.2 us ON-signal + | or 3.2 us OFF-signal + |
| 3.2 us ON-signal + | 3.2 us OFF-signal + |
| 3.2 us OFF-signal + | 3.2 us ON-signal + |
| 3.2 us OFF-signal | 3.2 us ON-signal |
| or 3.2 us OFF-signal + | or 3.2 us ON-signal + |
| 3.2 us OFF-signal + | 3.2 us ON-signal + |
| 3.2 us ON-signal + | 3.2 us OFF-signal + |
| 3.2 us ON-signal | 3.2 us OFF-signal |

Table 7 does not separately indicate the CP. Actually, when including the CP, CP+3.2 us+CP+3.2 us+CP+3.2 us+CP+3.2 us or CP+3.2 us+3.2 us+3.2 us+3.2 us may indicate one 1-bit information. More specifically, in case of CP+3.2 us+CP+3.2 us+CP+3.2 us+CP+3.2 us, the 3.2 us ON-signal may be regarded as a (CP+3.2 us) ON-signal, and the 3.2 us OFF-signal may be regarded as a (CP+3.2 us) OFF-signal.

As yet another example, a symbol having Manchester coding applied thereto may be indicated as n number of (CP+1.6 us+CP+1.6 us) or CP+n number of (1.6 us+1.6 us).

According to this exemplary embodiment, 1 bit is indicated by a symbol that is repeated n (n>=2) number of times, and, after applying a specific sequence to all of the subcarriers that are available for usage (e.g., 13 subcarriers) and setting a coefficient of 0 for the remaining subcarriers, IFFT is performed so as to generate a signal (symbol) of 3.2 us having a cycle of 1.6 us. Herein, one of the configured signals is selected and set (or configured) as a 1.6 us information signal (symbol).

A sub-information may be referred to as a 1.6 us information signal. The 1.6 us information signal may correspond to a 1.6 us ON-signal or a 1.6 us OFF-signal. The 1.6 us ON-signal and the 1.6 us OFF-signal may have different sequences applied thereto in each subcarrier. The 1.6 us OFF-signal may be generated by applying 0s to all of the coefficients.

The CP may select and use a part corresponding having a specific length at an end part of the information signal 1.6 us that immediately follows the CP. At this point, the CP may correspond to 0.4 us or 0.8 us. This length corresponds to the same length as the guard interval of 802.11ac.

Therefore, a 1-bit information corresponding to a symbol having Manchester coding applied thereto based on symbol repetition may be indicated as shown below in the following table.

TABLE 8

| Information '0' | Information '1' |
|---|---|
| (1.6 us ON-signal + 1.6 us OFF-signal) is repeated n number of times or (1.6 us OFF-signal + 1.6 us ON-signal) is repeated n number of times | (1.6 us OFF-signal + 1.6 us ON-signal) is repeated n number of times or (1.6 us ON-signal + 1.6 us OFF-signal) is repeated n number of times |
| (1.6 us ON-signal + 1.6 us OFF-signal) + (1.6 us OFF-signal + 1.6 us ON-signal) is repeated floor(n/2) number of times + (1.6 us ON-signal + 1.6 us OFF-signal) when needed | (1.6 us OFF-signal + 1.6 us ON-signal) + (1.6 us ON-signal + 1.6 us OFF-signal) is repeated floor(n/2) number of times + (1.6 us OFF-signal + 1.6 us ON-signal) when needed |
| (1.6 us OFF-signal + 1.6 us ON-signal) + (1.6 us ON-signal + 1.6 us OFF-signal) is repeated floor(n/2) number of times + (1.6 us OFF-signal + 1.6 us ON-signal) when needed | (1.6 us ON-signal + 1.6 us OFF-signal) + (1.6 us OFF-signal + 1.6 us ON-signal) is repeated floor(n/2) number of times + (1.6 us ON-signal + 1.6 us OFF-signal) when needed |

Table 8 does not separately indicate the CP. Actually, when including the CP, n number of (CP+1.6 us+CP+1.6 us) or CP+n number of (1.6 us+1.6 us) may indicate one 1-bit information. More specifically, in case of the n number of (CP+1.6 us+CP+1.6 us), the 1.6 us ON-signal may be regarded as a (CP+1.6 us) ON-signal, and the 1.6 us OFF-signal may be regarded as a (CP+1.6 us) OFF-signal.

As shown in the above-described exemplary embodiments, by using the symbol repetition method, the range requirement of the low-power wake-up communication may be satisfied. In case of applying only the OOK scheme, the data rate for one symbol is 250 Kbps (4 us). At this point, if the symbol is repeated 2 times by using the symbol repetition method, the data rate may become 125 Kbps (8 us), and, if the symbol is repeated 4 times, the data rate may become 62.5 Kbps (16 us), and, if the symbol is repeated 8 times, the data rate may become 31.25 Kbps (32 us). In case of the low-power communication, if the BCC does not exist, the symbol should be repeated 8 times in order to satisfy the range requirement.

Figure 12:
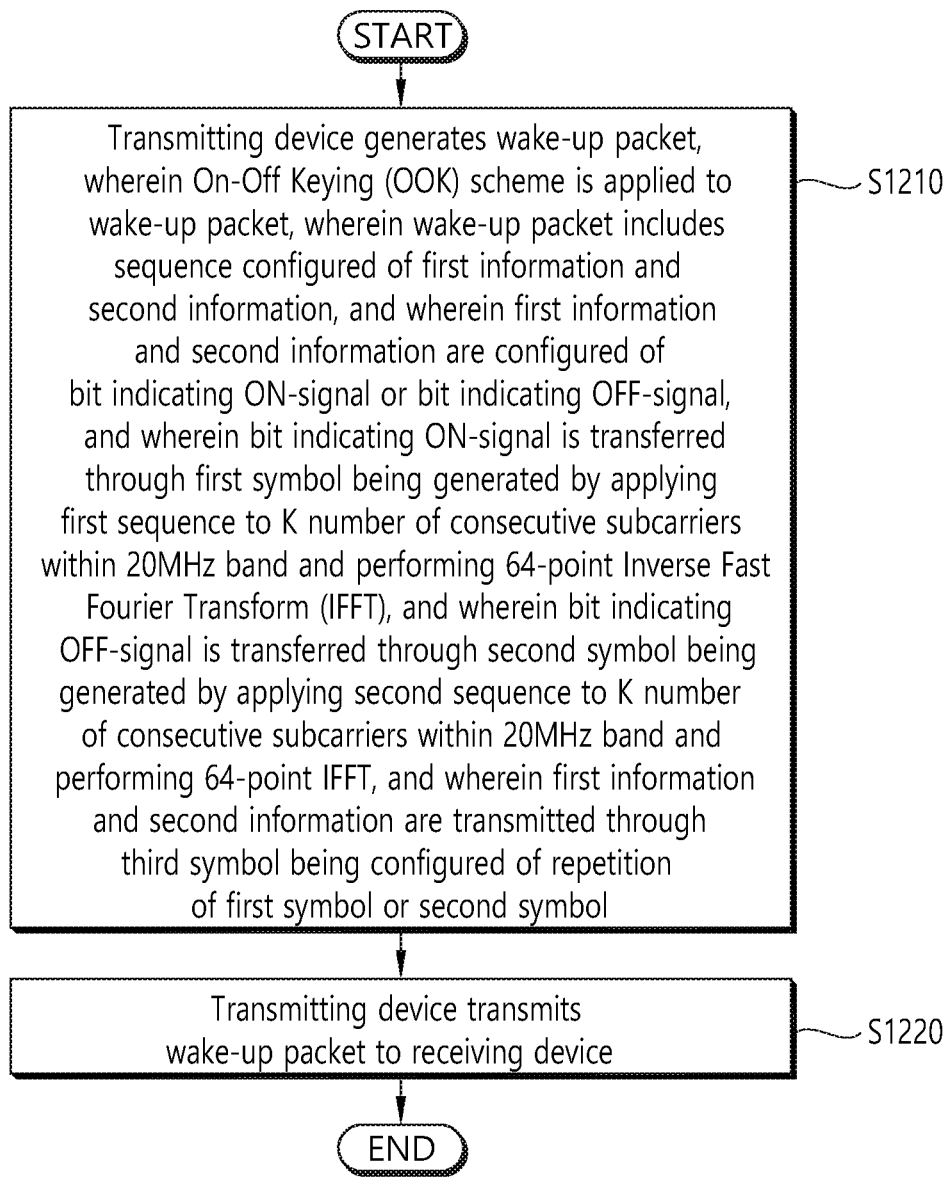
FIG. 12 is a flow chart showing a procedure of transmitting a signal after applying the OOK scheme and the symbol repetition method according to an exemplary embodiment of this specification.

FIG. 12 is a flow chart showing a procedure of transmitting a signal after applying the OOK scheme and the symbol repetition method according to an exemplary embodiment of this specification.

The example of FIG. 12 is performed by a transmitting device. And, a receiving device may correspond to a low-power wake-up receiver, and the transmitting device may correspond to an AP.

Firstly, the terms will be defined. An ON-signal may correspond to a signal having an actual power value. An OFF-signal may correspond to a signal that does not have an actual power value. A first information may correspond to Information 0, and a second information may correspond to Information 1.

In step S1210, the transmitting device generates a wake-up packet.

In step S1220, the transmitting device transmits the wake-up packet to the receiving device.

The generation process of the wake-up packet will hereinafter be described in detail.

The On-Off Keying (OOK) scheme is applied in the wake-up packet. Accordingly, the wake-up packet includes a sequence being configured of the first information and the second information.

The first information and the second information are configured of an ON-signal or an OFF-signal. The ON-signal may indicate 1, and the OFF-signal may indicate 0.

The ON-signal is transmitted through a first symbol, which is generated by applying a first sequence on K number of consecutive subcarriers of a 20 MHz band and by performing 64-point Inverse Fast Fourier Transform (IFFT). More specifically, the ON-signal may be transmitted through a symbol, which is generated by performing IFFT on one bit. At this point, K is an integer.

Additionally, the OFF-signal may be transmitted through a second symbol, which is generated by applying a second sequence to K number of consecutive subcarriers of a 20 MHz band and by performing 64-point IFFT. In the second sequence, the coefficients of all subcarriers are set to 0.

The first information and the second information are transmitted through a third symbol, which corresponds to a repetition of the first symbol or the second symbol. By performing the symbol repetition method, the symbol (time domain signal) that is generated by performing IFFT may be repeated at least 2 times or more, thereby extending the length of a symbol.

It will be assumed that the symbol that is generated by performing IFFT is repeated n number of times. Herein, n is an integer being equal to 2 or more. Therefore, the third symbol may be configured of n number of symbols. The first information and the second information may be configured of n number of ON-signals or OFF-signals.

For example, the first information may be configured of only n number of OFF-signals, and the second information may be configured of only n number of ON-signals. Additionally, the first information may be configured of a combination of ON-signals and OFF-signals corresponding to n number of signals. And, the second information may also be configured of a combination of ON-signals and OFF-signals corresponding to n number of signals.

More specifically, in a case where n is equal to 4, various exemplary embodiments of the configuration of the first information and the second information will hereinafter be described in detail. Herein, the ON-signal may be indicated as a 3.2 us ON-signal, and the OFF-signal may be indicated as a 3.2 us OFF-signal.

For example, the first information may be configured of 3.2 us OFF-signal+3.2 us OFF-signal+3.2 us OFF-signal+3.2 us OFF-signal, and the second information may be configured of 3.2 us ON-signal+3.2 us ON-signal+3.2 us ON-signal+3.2 us ON-signal. More specifically, the first information may be configured only of OFF-signals, and the second information may be configured only of ON-signals. In other words, the first information may be configured of 4 OFF-signals, and the second information may be configured of 4 ON-signals.

As another example, the first information may be configured of 3.2 us ON-signal+3.2 us ON-signal+3.2 us ON-signal+3.2 us OFF-signal, and the second information may be configured of 3.2 us ON-signal+3.2 us ON-signal+3.2 us OFF-signal+3.2 us ON-signal. More specifically, each of the first information and the second information may be configured to include one OFF-signal, and the remaining signals may all correspond to ON-signals.

As yet another example, the first information may be configured of 3.2 us ON-signal+3.2 us ON-signal+3.2 us OFF-signal+3.2 us ON-signal, and the second information may be configured of 3.2 us ON-signal+3.2 us ON-signal+3.2 us ON-signal+3.2 us OFF-signal. Although the signal alignment order is different, as described above in the previous example, each of the first information and the second information may be configured to include one OFF-signal, and the remaining signals may all correspond to ON-signals.

As yet another example, the first information may be configured of 3.2 us ON-signal+3.2 us ON-signal+3.2 us OFF-signal+3.2 us ON-signal, and the second information may be configured of 3.2 us ON-signal+3.2 us OFF-signal+ 3.2 us ON-signal+3.2 us ON-signal. Similarly, although the signal alignment order is different, as described above in the previous examples, each of the first information and the second information may be configured to include one OFF-signal, and the remaining signals may all correspond to ON-signals.

As yet another example, the first information may be configured of 3.2 us ON-signal+3.2 us OFF-signal+3.2 us ON-signal+3.2 us ON-signal, and the second information may be configured of 3.2 us ON-signal+3.2 us ON-signal+ 3.2 us OFF-signal+3.2 us ON-signal. Similarly, although the signal alignment order is different, as described above in the previous examples, each of the first information and the second information may be configured to include one OFF-signal, and the remaining signals may all correspond to ON-signals.

As yet another example, the first information may be configured of 3.2 us ON-signal+3.2 us ON-signal+3.2 us OFF-signal+3.2 us OFF-signal or 3.2 us OFF-signal+3.2 us OFF-signal+3.2 us ON-signal+3.2 us ON-signal, and the second information may be configured of 3.2 us OFF-signal+3.2 us OFF-signal+3.2 us ON-signal+3.2 us ON-signal or 3.2 us ON-signal+3.2 us ON-signal+3.2 us OFF-signal+3.2 us OFF-signal. Similarly, although the signal alignment order is different, as described above in the previous examples, each of the first information and the second information may be configured to include one OFF-signal, and the remaining signals may all correspond to ON-signals.

According to the exemplary embodiment of this specification, each of the first information and the second information may be configured of one OFF-signal and three ON-signals.

As a further example, the first information may be configured of 3.2 us ON-signal+3.2 us OFF-signal+3.2 us ON-signal+3.2 us OFF-signal, and the second information may be configured of 3.2 us OFF-signal+3.2 us ON-signal+ 3.2 us OFF-signal+3.2 us ON-signal. More specifically, each of the first information and the second information may be configured of two OFF-signals and two ON-signals.

Additionally, the wake-up packet may include a wake-up preamble and a wake-up payload. The third symbol may be included in the wake-up payload.

According to the symbol repetition method, by generating a wake-up packet (most particularly, a wake-up payload) by repeating symbols, a range that is required in low-latency (or low-delay) communication may be satisfied.

For example, in case n is equal to 2, the data rate of the wake-up payload may be 125 Kbps. In case n is equal to 4, the data rate of the wake-up payload may be 62.5 Kbps. And, in case n is equal to 8, the data rate of the wake-up payload may be 31.25 Kbps. By applying the symbol repetition method, a range that is required in low-latency communication may be more easily achieved as compared to a case where only the OOK scheme is applied.

Additionally, even though the symbol is repeated n number of times, each of the first information and the second information corresponds to a 1-bit information.

Additionally, the ON-signal may correspond to a signal given a power value of alpha*ones(1,K). The OFF-signal may correspond to a signal given a power value of zeros(1, K). The alpha is a power normalization factor and may, for example, be equal to 1/sqrt(K). More specifically, the transmitting device may know, in advance, the power values of the ON-signal and the OFF-signal and may configure the first information and the second information accordingly. By using an envelope detector for decoding the first information and the second information, the receiving device may reduce the amount of power that is consumed when performing the decoding process.

The K number of subcarriers may correspond to a partial band of the 20 MHz band. For example, when it is assumed that K=13, and that 20 MHz corresponds to the reference band, even though 64 subcarriers (or bit sequences) may be used, only 13 subcarriers are sampled and processed with IFFT. Accordingly, the 13 subcarriers may correspond to a band of approximately 4.06 MHz. More specifically, a specific sequence (first sequence or second sequence) is configured only in the 13 subcarriers, which are selected as a sample, and the remaining subcarriers excluding the 13 subcarriers are all set to 0. More specifically, in the frequency domain, it may be understood that the power exists for only 4.06 MHz of the 20 MHz band.

Additionally, the subcarrier spacing between each of the K number of subcarriers may correspond to 312.5 KHz. Each of the first symbol and the second symbol may have a length of 3.2 us. Accordingly, if the cyclic prefix (CP) is excluded, the third symbol may have a length of n*3.2 us.

Moreover, by inserting a cyclic prefix (CP) in front of each symbol, the occurrence of Inter Symbol Interference (ISI) may be reduced or prevented.

For example, the first information and the second information may include a cyclic prefix (CP). The CP may be inserted in front of each of the first symbol and the second symbol, or the CP may be inserted only in front of the third symbol. If the CP is inserted in front of each of the first symbol and the second symbol, the symbol that is generated by performing the symbol repetition method may be configured of n number of (CP+3.2 us). If the CP is inserted only in front of the third symbol, the symbol that is generated by performing the symbol repetition method may be configured of CP+n number of (3.2 us). The former case is effective in case the influence of the ISI exists in the mid-portion of the signal, and the latter case is effective in case the influence of the ISI is larger at the foremost part of the signal.

At this point, the CP may be given a length of 0.4 us or 0.8 us.

Figure 13:
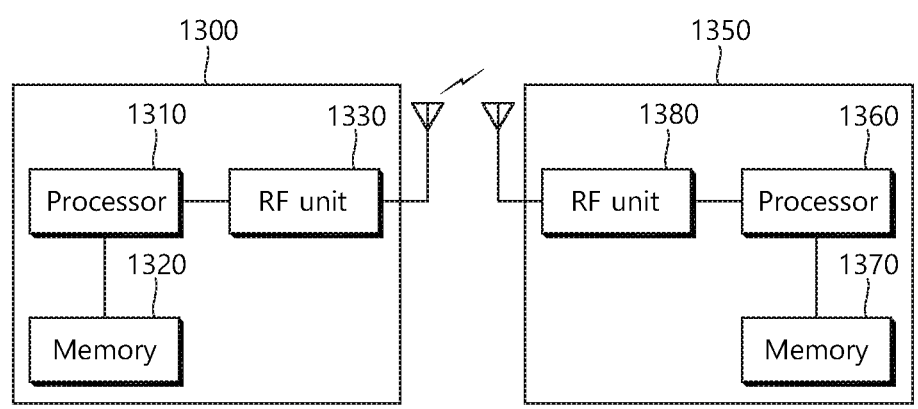
FIG. 13 is a block view illustrating a wireless device to which the exemplary embodiment of the present invention can be applied.

FIG. 13 is a block view illustrating a wireless device to which the exemplary embodiment of the present invention can be applied.

Referring to FIG. 13, as an STA that can implement the above-described exemplary embodiment, the wireless device may correspond to an AP or a non-AP station (STA). The wireless device may correspond to the above-described user or may correspond to a transmitting device transmitting a signal to the user.

The AP (1300) includes a processor (1310), a memory (1320), and a radio frequency (RF) unit (1330).

The RF unit (1330) is connected to the processor (1310), thereby being capable of transmitting and/or receiving radio signals.

The processor (1310) implements the functions, processes, and/or methods proposed in the present invention. For example, the processor (1310) may be implemented to perform the operations according to the above-described exemplary embodiments of the present invention. More specifically, among the operations that are disclosed in the exemplary embodiments of FIG. 1 to FIG. 12, the processor (1310) may perform the operations that may be performed by the AP.

The non-AP STA (1350) includes a processor (1360), a memory (1370), and a radio frequency (RF) unit (1380).

The RF unit (1380) is connected to the processor (1360), thereby being capable of transmitting and/or receiving radio signals.

The processor (1360) implements the functions, processes, and/or methods proposed in the present invention. For example, the processor (1360) may be implemented to perform the operations of the non-AP STA according to the above-described exemplary embodiments of the present invention. The processor may perform the operations of the non-AP STA, which are disclosed in the exemplary embodiments of FIG. 1 to FIG. 12.

The processor (1310, 1360) may include an application-specific integrated circuit (ASIC), another chip set, a logical circuit, a data processing device, and/or a converter converting a baseband signal and a radio signal to and from one another. The memory (1320, 1370) may include a read-only memory (ROM), a random access memory (RAM), a flash memory, a memory card, a storage medium, and/or another storage device. The RF unit (1330, 1380) may include one or more antennas transmitting and/or receiving radio signals.

When the exemplary embodiment is implemented as software, the above-described method may be implemented as a module (process, function, and so on) performing the above-described functions. The module may be stored in the memory (1320, 1370) and may be executed by the processor (1310, 1360). The memory (1320, 1370) may be located inside or outside of the processor (1310, 1360) and may be connected to the processor (1310, 1360) through a diversity of well-known means.

What is claimed is:

1. A method for transmitting a wake-up packet in a wireless LAN system, the method comprising:
    generating, by a transmitting device, the wake-up packet; and
    transmitting, by the transmitting device, the wake-up packet to a receiving device,
    wherein an On-Off Keying (OOK) scheme is applied to the wake-up packet including first information and second information,
    wherein the first information and the second information are configured of an ON-signal or an OFF-signal,
    wherein the ON-signal is transferred through a first symbol being generated by applying a first sequence to K number of consecutive subcarriers within a 20 MHz band and performing 64-point Inverse Fast Fourier Transform (IFFT),
    wherein the OFF-signal is transferred through a second symbol being generated by applying a second sequence to K number of consecutive subcarriers within a 20 MHz band and performing 64-point IFFT,
    wherein the first information and the second information are transmitted through third symbols being configured of a repetition of the first symbol or the second symbol,
    wherein K is an integer,
    wherein, if a number of the third symbols is equal to 2, a data rate of the wake-up packet is 125 Kbps,
    wherein, if the number of the third symbols is equal to 4, the data rate of the wake-up packet is 62.5 Kbps, and
    wherein, if the number of the third symbols is equal to 8, the data rate of the wake-up packet is 31.25 Kbps.

2. The method of claim 1, wherein the third symbols are configured of n number of symbols,
    wherein the first information and the second information are configured of n number of ON-signals or OFF-signals, and
    wherein n is an integer being equal to or greater than 2.

3. The method of claim 2, wherein the ON-signal indicates 1, and
    wherein the OFF-signal indicates 0.

4. The method of claim 2, wherein the wake-up packet includes a wake-up preamble and a wake-up payload, and
    wherein the third symbols are included in the wake-up payload.

5. The method of claim 2, wherein, in case n is equal to 4, the first information is configured in an order of ON-signal, OFF-signal, ON-signal, OFF-signal, and
    wherein the second information is configured in an order of OFF-signal, ON-signal, OFF-signal, ON-signal.

6. The method of claim 2, wherein, in case n is equal to 4, the first information is configured in an order of ON-signal, ON-signal, OFF-signal, OFF-signal, and
    wherein the second information is configured in an order of OFF-signal, OFF-signal, ON-signal, ON-signal.

7. The method of claim 1, wherein the first sequence and the second sequence are different from one another, and
    wherein coefficients of all subcarriers are set to 0 in the second sequence.

8. The method of claim 1, wherein the K number of subcarriers correspond to a partial band of the 20 MHz band,
    wherein subcarrier spacing for each of the K number of subcarriers is equal to 312.5 KHz, and
    wherein each of the first symbol and the second symbol has a length of 3.2 us.

9. The method of claim 8, wherein each of the first information and the second information includes a cyclic prefix (CP),
    wherein the CP is inserted in front of each of the first symbol and the second symbol, or wherein the CP is inserted only in front of the third symbols, and
    wherein the CP has a length of 0.4 us or 0.8 us.

10. A transmitting device for transmitting a wake-up packet in a wireless LAN system, the transmitting device comprising:
    a transceiver configured to transmit or receive radio signals; and
    a processor configured to control the transceiver,
    wherein the processor is further configured to:
    generate the wake-up packet; and
    transmit the wake-up packet to a receiving device,
    wherein an On-Off Keying (OOK) scheme is applied to the wake-up packet including first information and second information,
    wherein the first information and the second information are configured of an ON-signal or an OFF-signal,
    wherein the ON-signal is transferred through a first symbol being generated by applying a first sequence to K number of consecutive subcarriers within a 20 MHz band and performing 64-point Inverse Fast Fourier Transform (IFFT),
    wherein the OFF-signal is transferred through a second symbol being generated by applying a second sequence to K number of consecutive subcarriers within a 20 MHz band and performing 64-point IFFT,
    wherein the first information and the second information are transmitted through third symbols being configured of a repetition of the first symbol or the second symbol,
    wherein K is an integer,
    wherein, if a number of the third symbols is equal to 2, a data rate of the wake-up packet is 125 Kbps, wherein, if the number of the third symbols is equal to 4, the data rate of the wake-up packet is 62.5 Kbps, and wherein, if the number of the third symbols is equal to 8, the data rate of the wake-up packet is 31.25 Kbps.

11. The transmitting device of claim 10, wherein the third symbols are configured of n number of symbols, wherein the first information and the second information are configured of n number of ON-signals or OFF-signals, and wherein n is an integer being equal to or greater than 2.

12. The transmitting device of claim 11, wherein the ON-signal indicates 1, and wherein the OFF-signal indicates 0.

13. The transmitting device of claim 11, wherein the wake-up packet includes a wake-up preamble and a wake-up payload, and wherein the third symbols are included in the wake-up payload.

14. The transmitting device of claim 11, wherein, in case n is equal to 4, the first information is configured in an order of ON-signal, OFF-signal, ON-signal, OFF-signal, and wherein the second information is configured in an order of OFF-signal, ON-signal, OFF-signal, ON-signal.

15. The transmitting device of claim 11, wherein, in case n is equal to 4, the first information is configured in an order of ON-signal, ON-signal, OFF-signal, OFF-signal, and wherein the second information is configured in an order of OFF-signal, OFF-signal, ON-signal, ON-signal.

16. The transmitting device of claim 10, wherein the first sequence and the second sequence are different from one another, and wherein coefficients of all subcarriers are set to 0 in the second sequence.

17. The transmitting device of claim 10, wherein the K number of subcarriers correspond to a partial band of the 20 MHz band, wherein subcarrier spacing for each of the K number of subcarriers is equal to 312.5 KHz, and wherein each of the first symbol and the second symbol has a length of 3.2 us.

18. The transmitting device of claim 17, wherein each of the first information and the second information includes a cyclic prefix (CP), wherein the CP is inserted in front of each of the first symbol and the second symbol, or wherein the CP is inserted only in front of the third symbols, and wherein the CP has a length of 0.4 us or 0.8 us.

* * * * *